US011607041B2

(12) United States Patent
Siples et al.

(10) Patent No.: US 11,607,041 B2
(45) Date of Patent: Mar. 21, 2023

(54) CUSTOMIZABLE SLIDABLE SHELVING AND SUPPORT SYSTEM FOR HORTICULTURE APPLICATIONS

(71) Applicant: Grow Glide Inc., Riverside, CA (US)

(72) Inventors: Darin Siples, Highland, CA (US); Travis Schwartz, Highland Village, TX (US)

(73) Assignee: GROW GLIDE INC., Riverside, CA (US)

( * ) Notice: Subject to any disclaimer, the term of this patent is extended or adjusted under 35 U.S.C. 154(b) by 0 days.

(21) Appl. No.: 17/657,156

(22) Filed: Mar. 30, 2022

(65) Prior Publication Data

US 2022/0218108 A1 Jul. 14, 2022

Related U.S. Application Data

(63) Continuation of application No. 16/802,036, filed on Feb. 26, 2020, now Pat. No. 11,304,525.
(Continued)

(51) Int. Cl.
*A47B 96/02* (2006.01)
*A47B 91/00* (2006.01)
(Continued)

(52) U.S. Cl.
CPC ............ *A47B 96/021* (2013.01); *A01G 9/023* (2013.01); *A47B 57/406* (2013.01);
(Continued)

(58) Field of Classification Search
CPC combination set(s) only.
See application file for complete search history.

(56) References Cited

U.S. PATENT DOCUMENTS 2,802,575 A * 8/1957 Jeune ....................... B65G 1/07
108/106
2,828,826 A * 4/1958 Riemenschneider .. A47B 53/02
180/65.6
(Continued)

FOREIGN PATENT DOCUMENTS

CN 206354050 U 7/2017
CN 206603530 U 11/2017
(Continued)

OTHER PUBLICATIONS

PCT; International Search Report in the International Application No. PCT/US2020/019893 dated May 28, 2020.
(Continued)

*Primary Examiner* — Monica E Millner
(74) *Attorney, Agent, or Firm* — Snell & Wilmer L.L.P.

(57) ABSTRACT

The invention is a customizable, slidable shelving and support apparati and system for supporting, storing and accessing horticultural and agricultural specimens within growing spaces, allowing growers to utilize the maximum amount of their linear horizontal and vertical grow space and service specific areas of the garden enterprise while also allowing for maximum workspace through the use of a table and track system that provides stackable options of multiple grow layers. A method of using this slidable shelving and support apparati and system is also included.

19 Claims, 15 Drawing Sheets

Related U.S. Application Data

(60) Provisional application No. 62/810,589, filed on Feb. 26, 2019.

(51) Int. Cl.

| | | |
|---|---|---|
| *A47B 57/40* | (2006.01) | |
| *B25H 3/04* | (2006.01) | |
| *A01G 9/02* | (2018.01) | |
| *A47B 91/08* | (2006.01) | |

(52) U.S. Cl.
CPC ............ *A47B 91/002* (2013.01); *A47B 91/08* (2013.01); *B25H 3/04* (2013.01)

(56) References Cited

U.S. PATENT DOCUMENTS

| | | | | |
|---|---|---|---|---|
| 2,897,013 | A * | 7/1959 | Delp ................. | E04G 7/301 |
| | | | | 52/645 |
| 3,007,708 | A * | 11/1961 | Ochs ................. | B62B 3/002 |
| | | | | 211/187 |
| 3,506,138 | A * | 4/1970 | Travis ................ | A47B 55/02 |
| | | | | 108/53.5 |
| 5,048,429 | A * | 9/1991 | Freiberg ............. | A47B 57/54 |
| | | | | 108/106 |
| 6,135,299 | A * | 10/2000 | Burgess .............. | B62B 3/006 |
| | | | | 211/150 |
| 6,286,691 | B1 * | 9/2001 | Oberhaus ............ | A47F 5/0892 |
| | | | | 211/90.03 |
| 9,986,697 | B1 * | 6/2018 | Gurin ................. | A01G 31/06 |
| 10,390,504 | B2 * | 8/2019 | Dufresne ............. | B65G 1/026 |
| 11,116,148 | B1 * | 9/2021 | French ............... | A01G 9/1476 |
| 2007/0125737 | A1 * | 6/2007 | O'Reilly ............. | A47B 57/44 |
| | | | | 211/186 |
| 2009/0307973 | A1 * | 12/2009 | Adams ............... | A01G 31/06 |
| | | | | 47/62 C |
| 2010/0107489 | A1 * | 5/2010 | Silver ................. | A01G 9/249 |
| | | | | 47/58.1 R |
| 2012/0060416 | A1 * | 3/2012 | Brusatore ............ | A01G 31/06 |
| | | | | 47/62 A |
| 2015/0150198 | A1 * | 6/2015 | Sinha ................. | A01G 27/00 |
| | | | | 29/891 |
| 2015/0173316 | A1 * | 6/2015 | Hansen, Jr. ......... | A01G 31/02 |
| | | | | 47/60 |
| 2016/0345518 | A1 * | 12/2016 | Collier ............... | A01G 9/249 |
| 2017/0027110 | A1 * | 2/2017 | Ito ..................... | A01G 7/045 |
| 2018/0007850 | A1 * | 1/2018 | Dufresne ............ | B65G 1/026 |
| 2018/0042192 | A1 * | 2/2018 | Volpe ................. | A01G 31/04 |

FOREIGN PATENT DOCUMENTS

| | | |
|---|---|---|
| DE | 202012100513 | 6/2012 |
| EP | 1380230 | 1/2004 |
| GB | 2481823 | 1/2012 |
| RU | 8870 | 1/1999 |
| WO | 2016014843 | 1/2016 |
| WO | 2017030524 | 2/2017 |

OTHER PUBLICATIONS

PCT; International Preliminary Report on Patentability in the International Application No. PCT/US2020/019893 dated Aug. 25, 2021.

USPTO; Office Action dated Oct. 21, 2021 in U.S. Appl. No. 16/802,036.

USPTO; Notice of Allowance dated Nov. 24, 2021 in U.S. Appl. No. 16/802,036.

AUIPO; Office Action dated Sep. 2, 2021 in AU Application No. 2020228044.

CNIPA; Office Action dated Apr. 6, 2022 in Application No. 202080016702.2.

CNIPA; Office Action dated Sep. 28, 2022 in Application No. 202080016702.2.

EPO; European search report dated Jan. 27, 2022 in EP Application No. 20763132.6.

* cited by examiner

CUSTOMIZABLE SLIDABLE SHELVING AND SUPPORT SYSTEM FOR HORTICULTURE APPLICATIONS

CROSS-REFERENCE TO RELATED APPLICATIONS

This application is a continuation of U.S. Ser. No. 16/802,036 filed on Feb. 26, 2020 and entitled "Customizable Slidable Shelving and Support System for Horticulture Applications." U.S. Ser. No. 16/802,036 claims priority to and the benefit of U.S. Provisional Ser. No. 62/810,589 filed Feb. 26, 2019 and entitled "Customizable Slidable Shelving and Support System for Horticulture Applications." Each of the foregoing applications is hereby incorporated by reference, including but not limited to those portions that specifically appear hereinafter, but except for any subject matter disclaimers or disavowals, and except to the extent that the incorporated material is inconsistent with the express disclosure herein, in which case the language in this disclosure shall control.

FIELD OF INVENTION

This invention relates to customizable slidable shelving and support systems for horticulture applications as used in greenhouses, warehouses, residential, and agricultural enterprises with limited floor space, adaptability of shelving units, and accessibility.

BACKGROUND OF INVENTION

Most warehouses and greenhouses have limited floor, storage, and working space available for staged growth phases and vertical height variation of plants. This also gives residents the option to perform at home gardening in their garage or other indoor setting to avoid severe outdoor weather and pest issues. Portable and non-portable shelving units occupy limited linear and vertical space within storage spaces, warehouse and greenhouse areas for staged optimal energy consumption to achieve optimal growth and cultivation.

Previous shelving apparati have presented limitations and disadvantages.

Many shelving units for horticultural purposes are placed upon limited floor space creating limited types, amounts and growth phases of plants which can be accommodated. Permanent shelving structures are limited in accessibility and must be withdrawn to gain access when maximizing the planar surfaces usable for various potted plants. Many times the access is limited as the top tier(s) are restricted from being fully customized for vertical variation of growth phases and plant type or are manufactured with a permanent design configuration. Greenhaus Industries (http://www.greenhausinc.com/), with PIPP Horticulture (http://www.pipphorticulture.com/), makes shelving systems with trays that are formed from a single piece of material, making them extremely heavy and large and restricting customization layout options. The wheel is recessed into a track, which when the wheel is introduced to the slightest variation in degree causes the wheel to jam in the track and not slide. Recessed track collects debris which prevents smooth movement of table. A gear system is employed to assist in table movement providing more moving parts thus increasing the difficulty of installation. Because their rack sits on a carriage, the bottom portion of the table is solid which restricts crucial lower air movement.

Another company that manufactures rolling tables is Rolling Herb Systems (https://www.facebook.com/rollingherbsystems/). They offer a rack and track arrangement used together with a separate tray that can be purchased.

Portable, or non-secured, shelving units and systems commonly used in horticultural practice are relatively large in size and can be heavy and awkward to move on a floor surface. Movement with a non-tracked shelving and storage system in contact with the floor or ceiling surface can potentially mar the floor or other contact surface. Additional force is required to reposition the unit and access subsequent shelving units in that the contact surfaces are not designed to be laterally moved across a surface. Location, weight and size put a user in danger of personal injury due to limited space, awkward positioning of the body, and the potential of toppling the shelving unit.

Borroughs Corporation (http.//www.borroughs.com) manufactures a table/tray system that lacks sturdiness and the ability for the table to be put on tracks for mobility. This company is now using similar a carriage system as PIPP Horticulture to make racks mobile. Also, like PIPP, their racks are not sturdy enough and lack the sheer support to simply mount the wheels to the rack.

Another company, Montel (http.//www.montel.com/) constructed a table system known as "Greenrak". This system is designed using already existing mobile pallet racking systems which are being "cross-advertised" in the growing industry. The disadvantage of this system is that it was built for moving a very heavy load capacity which is extreme overkill for horticulture applications. Therefore, the consumer spends high premiums on this system for a purpose that does not benefit them.

In cases where shelving units are firmly secured within the locating structures, the securing methods and confined space constraints severely limit, if not prohibit, shelving access. Securing shelving and support systems from unwanted movement, especially those in an accessible position, has not been addressed in previous designs.

In order to overcome the limitations described above, the operation of a customizable, slidable shelving and support system is required to provide easy mobility and allows for a workspace without wasting critical growing space.

DESCRIPTION OF RELATED ART

European Patent Application No. 1380230, to Ital Nomet SpA (Italy), describes a base for moveable shelving able to be arranged in a storage warehouse, a depot, or similar, where movement of the shelving is associated with a plurality of wheels, some of which are drive wheels, with associated drive means, allowing easy movement of the shelving. The shelving is slidably located on a track where at least two of the wheels serve as guide wheels.

German Patent No. 20 2012 100 513 U1, assigned to Atroisaxe (France), describes a shelving and racking system for the storage of files and products, where the system allows for storage compression and increased utilization of space. The shelving system is located on a track wheel system where dual wheel encasements are positioned on the track system. The shelving associated with this system is not customizable and is not designed for outdoor use or indoor use where the shelving unit comes in contact with water or wet/damp materials.

U.S. Pat. No. 2,828,826, to C. C. Riemenschneider, provides for a portable rack suitable for storage of items in close serial relation alongside an aisle and are individually moveable outward into the aisle for loading articles thereon and removal of articles therefrom. The rack has two spaced apart elongated tracks which are suitably spaced apart in parallel relation, each having a pair of wheels by which the rack is supported in a portable manner.

U.S. Pat. No. 3,007,708, to W. F. Ochs, relates to transportable light-weight rack assemblies for use in warehouses and stock rooms, which can be readily assembled or disassembled and may be readily adjustable as the shelves are connected to the rear and end walls, constructed of welded wire mesh, by means of hooks. The racks possess wheels for transport; however the wheels are not located on a track system. Use of the rack without wheels for transport is possible; however no mounting bracket is supplied for securing the rack.

U.S. Pat. No. 3,506,138, to M. A. Travis, describes a storage rack system of basic rack and frame components, where supplemental elements can assemble to the basic components to form a variety of segregated and protected storage areas for items of various shapes and sizes. The storage rack system is stackable at various heights, and designed to form a walkway between racks. Untracked wheels are incorporated for ease of movement.

U.S. Patent Publication No. 2010/0107489, N. Silver, describes an adjustable plant growing stand, a mounting clip for attaching a lighting fixture to an adjustable plant growing stand, and a method of illuminating plants. The upper shelf is fixed and a lower shelf is adjustable, and the shelves are slidably coupled to the legs. The lower adjustable shelf can include attachment mechanisms configured to fix the vertical height of the lower adjustable shelf relative to the upper fixed shelf. Each lighting fixture can include a plant growth-stimulating light source, and each lighting fixture can be removably coupled to the upper fixed shelf.

U.S. Pat. No. 8,151,518, assigned to New York Sun Works (New York), describes a vertically-integrated greenhouse for a lobby, interior atrium or similar glass or open structure to be used for growing plants in a suspended a moveable array of plant trays. Spacing and arrangement of the trays within the system can be adjusted to maximize crop yield. The system can be used to reduce building maintenance costs by providing shade, air treatment, and evaporative cooling to building occupants. A water distribution system is employed to provide irrigation and drainage of the plant trays.

U.S. Patent Publication No. 2018/0042192, assigned to Eden Works, Inc., provides a vertically-stacked growing system possessing horizontal shelves respectively arranged on different vertical levels. Each horizontal shelf has multiple walls to form a shallow pond when the horizontal shelf contains a plant nutrient water culture, thereby constituting a growing layer of the growing system. A plurality of germinated plants are situated on a plurality of rafts. A raft conveyance system is employed to move at least a first raft of the plurality of rafts through a first shallow pond contained in the first horizontal shelf.

U.K. Patent Application No. 2481823, to R. Sabin and M. Lawrence, describes a vertical plant growing system adapted to stand substantially vertical, and supporting at least two rows of at least one plant pot one above the other, and the support means supports each pot at an angle of between 35 Å° to 55 Å°. Water is delivered into the top of each pot in a first upper row of plant pots, directed water drains from the bottom of each plant pot into the top of each plant pot below it. The system collects water from the bottom of each plant pot in a bottom row of plant pots. The pots may be supported at an angle of 45 Å°. Baffles may be provided on each support means to direct water through an aperture. The apertures on one shelf may be staggered laterally relative to apertures on a shelf below. A trough at the top of the frame may provide the means to deliver water into the top of each pot.

U.S. Patent Publication No. 2016/0345518, assigned to Team Green Ltd., presents a vertical tier growing system for growing plants. The system includes at least one vertically tiered shelf section secured to and movable along a floor track. Each section has its own means to direct nutrient fluid and light to plants growing on each section. More especially, a vertical tiered growing system that is modular in structure with individual tiered sections movable about a track assembly thereby to reduce the footprint of the system to allow it to be accommodated in areas where space is limited.

SUMMARY OF THE INVENTION

The shelving and support system of the present disclosure is mounted on wheels and tracks to allow for slidability in such a manner as to encounter limited or no resistance to or impedance of movement, once the track wheel system is engaged. The track/wheel system is provided for use with a customizable, slidable shelving and support system that includes a method and apparatus designed to eliminate sticking or skewing of the wheels within the tracks and to prevent misalignment of the wheel within the track.

More specifically, this disclosure describes one or more portable slidable shelving and support apparati with a customizable tier configuration that includes interlocking trays with optional tray inserts comprising: a left side tray portion, a center tray portion and an optional right side tray portion, wherein the left side tray portion, center tray portion, and right side tray portion include a top planar portion wherein the slidable shelving and support apparati also includes a frame comprising a front beam, a sloped gutter, a rear beam, an optional center support cross member, a left upright support panel, and a right upright support panel wherein the rear beam is connected to the upright support panel and wherein a sloped gutter mounts to a backside of left and right upright support panels and is attached to the front beam so that the sloped gutter remains visible and wherein the rear beam is secured in an elevated position relative to the front beam that allows for increased drainage of interlocking trays and wherein the upright support panels include one or more grooved wheels attached to each leg of the upright support panels via an aperture that extends through a wheel axle and a fixture that utilizes the aperture such that the fixture is placed upon a mounted floor track surface wherein the slidable shelving and support apparati provides at least one workstation and/or storage area and thereby provides an optimal growth platform for botanical plants from which botanical extracts are extracted by placement of the support apparati in specific locations within certain geographic regions that include glass enclosed rooms and/or houses.

Here, additional features may be added that include a trellis pole located at least one or more of each top corner section of each of the upright support panels and wherein offset slotted mounting apertures exist for one or more upright supports that may be opposing upright supports.

The trays inserts have rounded edges and the tray inserts serve as workstation platforms occupied by plants and wherein the tray inserts are tilted downward and allow for water run-off to the sloped gutter.

The tray inserts are normally equal in height to that of the dividing walls of the interlocking trays so that when the tray inserts are set in place, each entire tray insert surface is level in a horizontal direction along a horizontal plane and allows placement of objects on any portion of the tray insert surface.

In a further embodiment, interlocking trays are configured to interconnect to provide a configuration as follows: the left side portion (L) is connected to a center portion ($C_n$) that is connected to a right side portion (R) that depends on a desired total width ($d_T$) of the slidable shelving and support apparatus, wherein $C_n$ is optional and n=0, 1, 2 and wherein a width (d) of each interlocking tray is a combined width comprising as $d_L$, a width of the left tray portion, $d_{C_n}$, a width of the center tray portion, and $d_R$ a width of the right tray portion respectively, where a total width ($d_T$) of all three tray portions within a fully assembled shelving and support apparatus is determined using Equation (1):

$$d_T = d_L + d_{C_n} + d_R \tag{1}$$

Often the trays include a predetermined drop along a bottom back panel of the interlocking trays that lock the trays onto the rear beam and a corresponding predetermined drop along the bottom front panel that locks the tray onto the sloped gutter and wherein the gutter locks onto and/or is part of, the front beam.

In further embodiments, a front portion of each tray is built without a lip portion so that water is allowed to run into the sloped gutter and may also include an optional angled left side tab on a front left portion of the left tray and an angled right side tab on a front right portion of the right tray that directs a flow of water inward that thereby assures water falls into the sloped gutter and prevents the tray inserts from sliding out of place.

The trays can include two or more hanging orifices in a rear wall of the interlocking trays that provide an ability for hanging the interlocking trays in a position that allows for time savings in cleaning/pressure washing the interlocking trays.

In addition, the slidable shelving is a two-tiered customizable slidable shelving and support system connected in series to another bay by sharing a single support upright consisting of a base channel support panel connected to an extension upright via a securing sleeve with driveshafts that connect each driven wheel axle along an entire length of the connected slidable shelving and support apparatus and is protected from accidental bending by drive shaft covers secured by bolts to both a front face and a top face of one or more wheel channels.

Also, the drive shaft(s) are connected to one or more drive axles of one or more drive wheels that are supported by two flange bearings bolted to a base wheel channel that allows for a portion of a base channel support panel using a securing sleeve that can also support an upright.

In addition, a method is provided for using one or more portable slidable shelving and support devices with customizable tier configurations that utilize interlocking trays with optional tray inserts comprising: a left side tray portion, a center tray portion and an optional right side tray portion, wherein said left side tray portion, center tray portion, and right side tray portion include a top planar portion wherein the slidable shelving and support apparati also includes a frame comprising a front beam, a sloped gutter, a rear beam, an optional center support cross member, a left upright support panel, and a right upright support panel wherein the rear beam is connected to the upright support panel and wherein a sloped gutter mounts to a backside of left and right upright support panels and is attached to the front beam so that the sloped gutter remains visible and wherein the rear beam is secured in an elevated position relative to the front beam that is allowing for increasing drainage of interlocking trays and wherein the upright support panels include one or more grooved wheels attached to each leg of the upright support panels via an aperture extending through a wheel axle and a fixture utilizing the aperture such that the fixture is placed upon a mounted floor track surface wherein the slidable shelving and support apparati are providing at least one workstation and/or storage area and thereby providing an optimal growth platform for botanical plants from which botanical extracts are extracted by placement of the support apparati in specific locations within certain geographic regions including glass enclosed rooms and/or houses.

The shelving system is also designed to house plants throughout their lifecycle in a clean efficient way with the added functionality of being able to surface mount lighting, trellises, water recycling systems, fans, working platforms, and other customizable options as desired by the user.

Thus, providing an easily moveable support frame that allows for ease of placement of the slidable shelving and support system for horticulture applications is desirable. This includes securing of the system and full accessibility for all areas of the system without diminishing the useable amount of floor space and increasing the usable vertical space, where use of the floor space and vertical space is customizable.

A customizable slidable shelving and support system for horticulture applications is provided which includes interlocking trays that allow for water drainage, corrugated food grade ABS inserts/risers, and gutters seamlessly incorporated into cross beams alleviating the need for screws/bolts or other fasteners that could provide leakage points within the drainage portion of the system. The gutter placement is set back in line with the face of upright support panels so that the gutters are protected, but the gutters remain easily accessible to service/clean. In addition, there are custom uprights that interlock to stack on top of each other along with having the capability to house the track wheels for bottom upright support panels. Another possibility is for a gutter: Current competitor bulkhead fittings rise up (normally about V) on the inside of the gutter requiring the water level in the gutter to have to rise a quarter inch in order to fall down the hole, leaving undesired stagnant water in the gutters at all times. Rather than there only being a hole (aperture) for the drain that requires a bulkhead fitting or something similar, there is a weld on the 1" male threading on the underside of the opening (hole). This will eliminate the need of the bulkhead fitting and allow water to fall directly down the hole further eliminating stagnant water, water waste, and reducing cleaning requirements, when compared to current bulkhead fittings.

Other features include a custom fabricated galvanized steel or aluminum track, quick mount rubber bumpers, and support brackets that will easily mount to cross members and upright support panels to provide shear stress support required to ensure the shelving is capable of reducing or eliminating any uneven shifting or "play". This allows the ability to create enough rigidness to assure that multiple tray tables can be interlocked and moved without the trays of the shelving and support system becoming uneven and causing wheels to bind with the track. The sliding shelving also has custom trellis poles that interlock with the top of uprights and provide the user an ability to easily adjust trellis pole height.

The customizable shelving includes various length options that allow maximum functionality and capabilities that work together with existing structural supports/obstacles. Using 2' by 4' trays to assemble 4', 6' and 8' trays, helps make shipping the shelving easier/cheaper because no packaging/protecting/shipping of large packaging/boxes or palletizing for shipping is required. This also allows for ease of use including ease of leaning, transporting, and initial setup of a growing facility where this shelving is employed.

By using as many interlocking methods as possible, the assembly process of these shelving units is simplified and saves both time and additional costs associated with completing currently available assemblies. Minimal tools are required for assembly, which include a Phillips-head screwdriver, cheap throw away wrenches to put on wheels, and a mallet to tap components into place (mallet is optional.)

The style and utility of the telescoping trellis pole is unique and the corrugated style insert eliminates flat and rough or sharp edge surfaces thereby creating maximum safety and atmospheric oxygen access to the root zone of plants being grown within the shelving assembly.

As the shelving and support system is movable, plumbing and electrical requirements are more complicated than for conventional shelving. There are many techniques that allow for overcoming these obstacles such as employing a dynamic holding assembly made to assist with overhead plumbing/electrical as provided in the drawings and associated embodiments.

Additional designs include a track that integrates a no-tip mechanism to assure there is no possibility of tipping during an earthquake and will assist clients that must pass earthquake proof inspections. An attachment can then be attached above the wheel onto an upright that extends outward and drops down and into the channel so that it hooks into the channel without touching to allow for it to move through the channel as table is moved. If the table does somehow have enough force to tip, this attachment will be locked into the channel and prevent it from tipping.

Movement of the shelving and support system is achieved simply by pushing the table in the forward or reverse direction as required. Other additional features can include a hand crank with interlocking gears to move the shelving. A chain will then connect the lower gear/sprocket to the upper gear/sprocket that is attached to the hand crank. This will allow for a user to turn the hand crank that will then move the table row from right to left with ease. Finally, electrical energy can be supplied to provide for mobility of the system. This requires use of an electric powered motor that attaches to the bottom of the upright support panels. The motor then turns a gear that interlocks with a track attached to the ground, or provides a means of force to propel the shelving system, or multiple layers of shelving systems, in a forward or reverse direction along the wheel track.

There will also be optional brackets that quickly connect to the face of the uprights that one can attach "wall mount" style fans to. These brackets will fit on uprights in a way that will not allow the fans to interfere with existing tables and will allow for fans to be attached back to back (two fans facing opposite directions) for optimal options and air circulation.

The unique connection system of the slidable shelving and support system allows that the platform can be placed at any height from 6 inches off the ground with no vertical limitation.

We will have brackets similar to the fan brackets that quickly connect to the face of the uprights. Once two rows of tables are opened to create an aisle, the brackets will be placed across from each other at a desired height and will receive and house the custom support beam. This beam will have corresponding attachment points that will fit into the brackets to ensure they are locked in place and cannot disconnect once the planks are attached. The beams attach to form a platform to walk on between two adjacent units. Once both beams are in place, six to eight inch (6-8") long planks that are notched out at the ends are used to interlock on the beams. The planks will be at six to eight inch (6-8") increments so the aisle width is optional in six to eight inch (6-8") increments.

An additional object of the present invention is that the slidable shelving and support system enables dry storage of consumer items as needed.

DETAILED DESCRIPTION

Disclosed below are several drawings that provide for a slidable support frame for the accessibility and portability which is needed to accelerate plant growth and more specifically for accelerated plant growth primarily in greenhouses.

Figure 1:
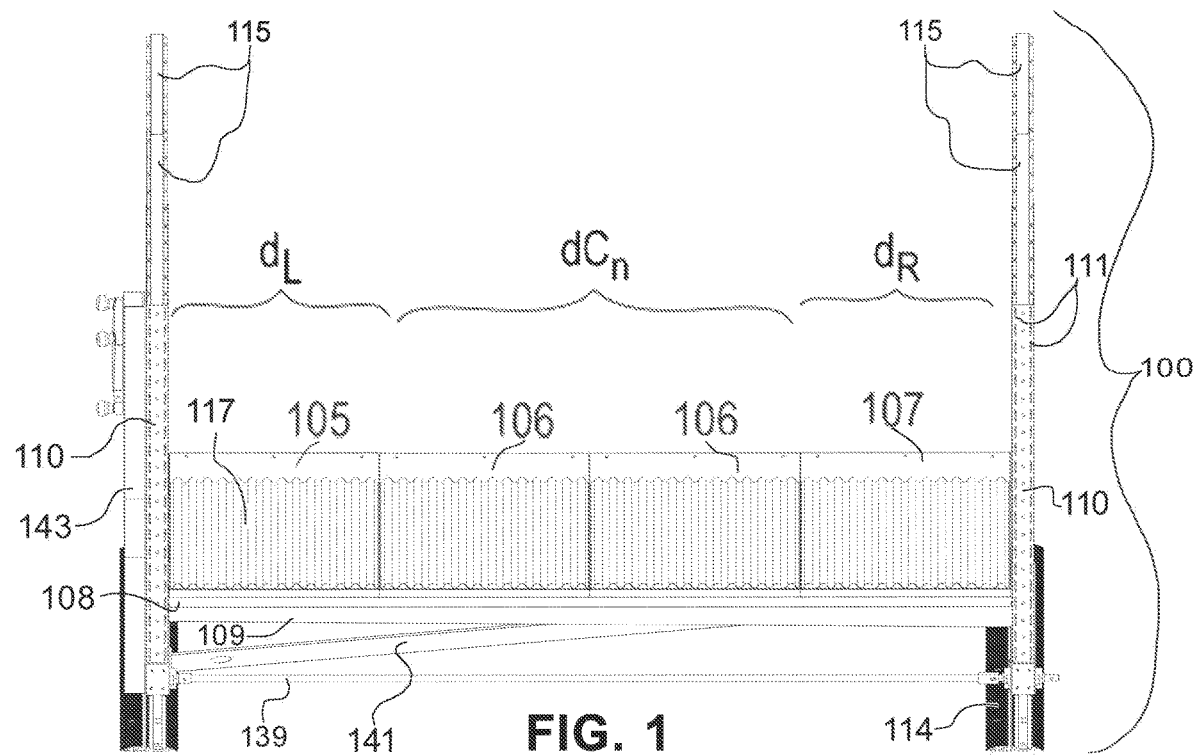
FIG. 1 is an isometric view of a single-tier customizable, slidable shelving and support system.
Figure 1A:
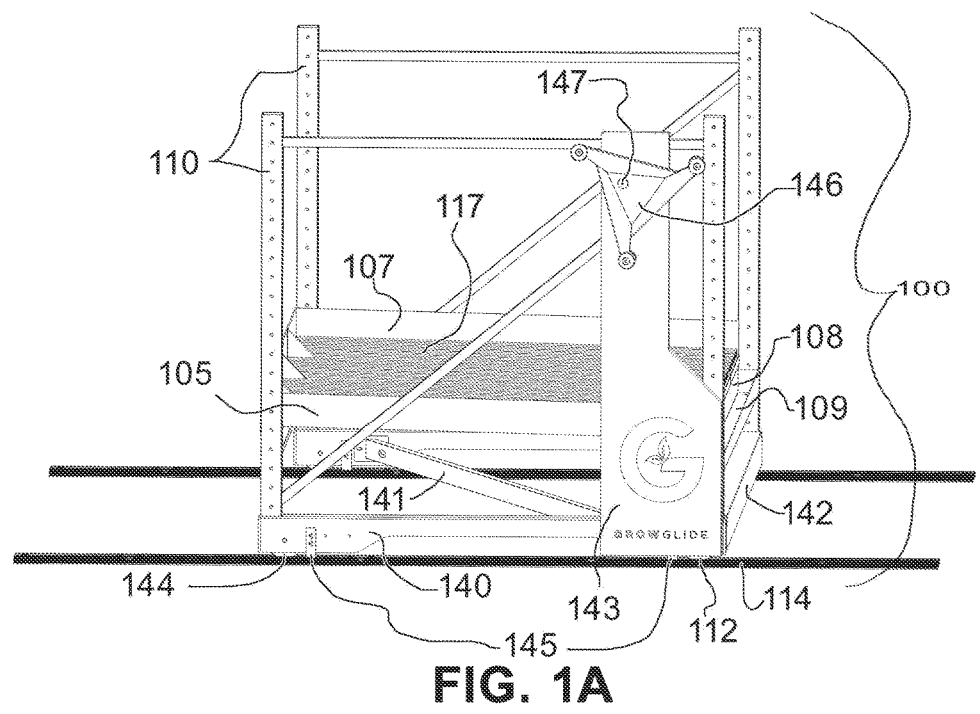
FIG. 1A is an illustrated side view of a single-tiered slidable shelving and support system.
Figure 1B:
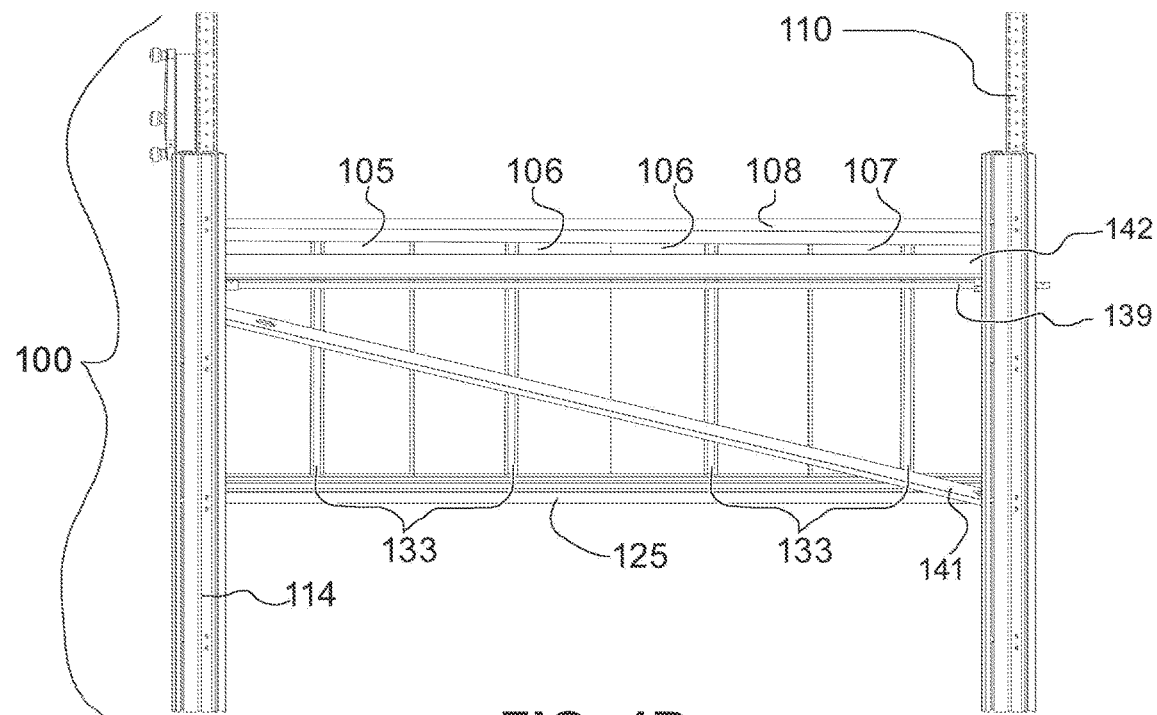
FIG. 1B provides a worm's-eye view of the slidable shelving and support system.

FIG. 1 represents a slidable shelving and support system [100], in a customizable double-tier configuration, that utilizes interlocking trays comprising a left tray (L) [105], center tray (C) [106] (optional) and right tray (R) [107], each housing a tray insert [117] with a top planar surface for use as a workstation or storage area. This shelving and support system includes a frame comprising a front beam [108] containing a sloped gutter [109] feature with a welded one-inch drain hole, a rear beam [125] (as shown in FIG. 1B), and two upright support panels [110], or uprights. The front gutter beam [109] attaches to the two upright support panels [110] on the interior face of the uprights via a boltless slotted connection system [111] (as shown in FIG. 5A), while the rear beam [125] attaches via the exterior face via a boltless slotted connection system [111], the interior slotted system is offset from the exterior slots by 1 inch to provide a slope for water drainage off of [105, 106, 107] into the slopped gutter [109] which angles drainage to the threaded drain hole. One axle-driven grooved wheel [112] (as shown in FIG. 1A) is attached to each upright support panel [110] housed within the base channel [140] (as shown in FIG. 1A). The base channel [140] provides a place for the wheels [112, 144 (as shown on FIG. 1A)] and uprights [110] to reside. One non-driven bearing wheel (as shown in FIG. 1A) is also attached to each base channel [140] and rolls freely.

The wheels roll on the two-piece mounted floor track consisting of an extruded aluminum track [114] and a steel bar [150]. A diagonal support [141] connects the base channel of left upright support panel [110] and the base channel of right upright support panel [110]. An optional drive box [143] mounts to the exterior of one or more uprights [110] and connects via a sprocket to the axle on the driven grooved wheel [112]. Driveshafts [139] connect each driven grooved wheel [112] axle along the entire length of the connected slidable shelving and support system [100] and is protected from accidental bending by the drive shaft cover [142] (further shown in FIGS. 1A & 1B).

Optional features can be added, such as a trellis pole [115], depicted at each top corner of the upright support panels [110].

FIG. 1A provides a side view of the first-tier portion of the slidable shelving and support system [100] and upright support panels [110] provided in FIG. 1. The Drive box handle [146] connects to the internal mechanism of the drive box [143] and allows for precise movement of the system [100] or multiple connected systems with minimal effort required. The drive box handle [146] has an attached locking mechanism [147] which prevents the system from moving when the lock is engaged. Due to the offset slotted connection system [111] (as shown in FIG. 5A) it can be seen that the offset of the rear beam and the front gutter beam [125, 108] creates a downward slope of the interlocking trays [105, 106, 107].

Optional Anti-Tip brackets [145] can be secured to the base channels [140] of uprights to prevent any potential tipping related to seismic events or improper use.

FIG. 1B provides a worm's-eye view of the slidable shelving and support system [100], and shows the accessory mounting bracket(s) [133] attached to the front beam [108] and rear beam [125]. The accessory mounting bracket(s) [133] allows for attachment of lights, fans, and other hanging features. They also provide underlying support for the interlocking trays [105,106,107].

Figure 1C:
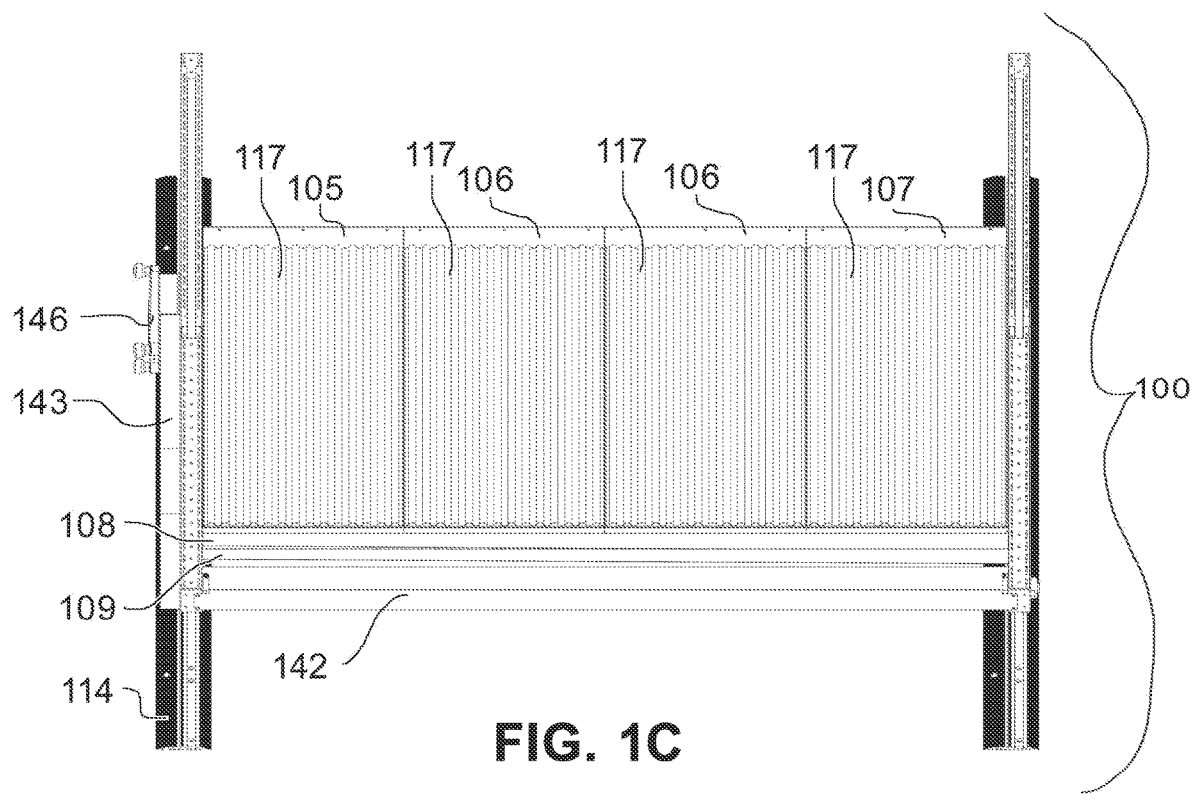
FIG. 1C is an elevated view of the planar work-station portion of a single-tiered slidable shelving and support system.

FIG. 1C provides an elevated view of the planar workstation portion of the slidable shelving and support system [100] and top planar surface of the interlocking trays [105, 106,107] provided in FIG. 1.

Figure 2A:
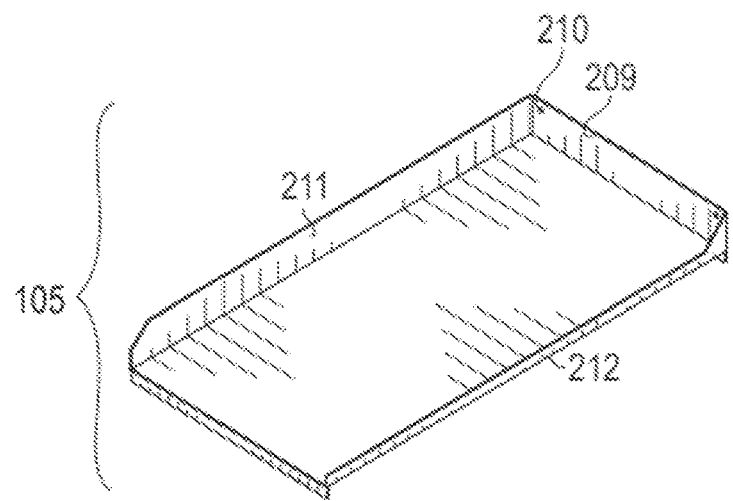
FIG. 2A is an isometric view of one of the inter-locking left trays.
Figure 2B:
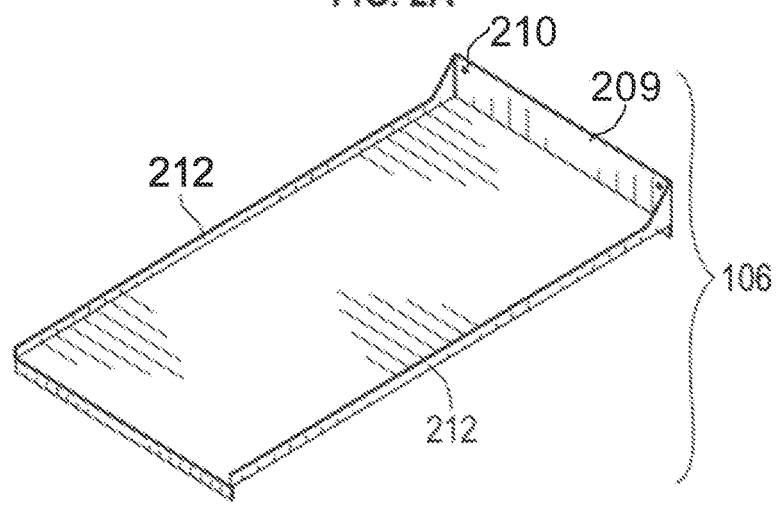
FIG. 2B is an isometric view of one of the inter-locking center trays.
Figure 2C:
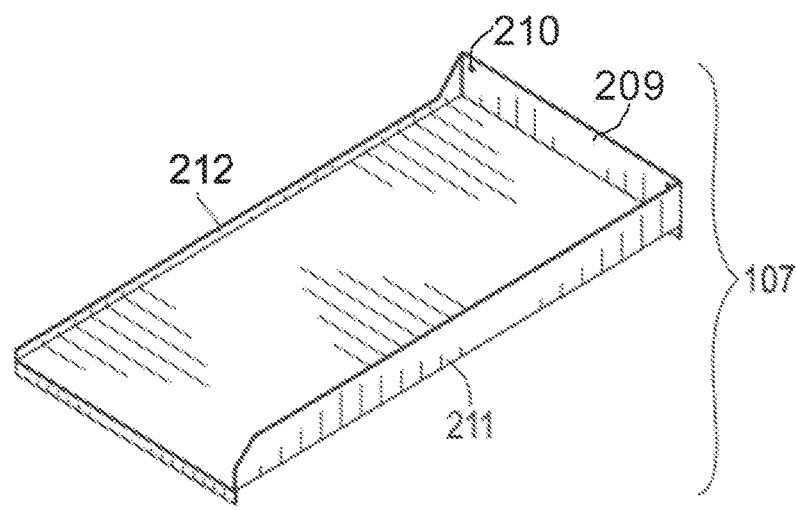
FIG. 2C is an isometric view of one of the inter-locking right trays.

The left tray (L) [105] is depicted in FIG. 2A, the center tray (C) [106] in FIG. 2B, the right tray (R) [107] in FIG. 2C.

Figure 2D:
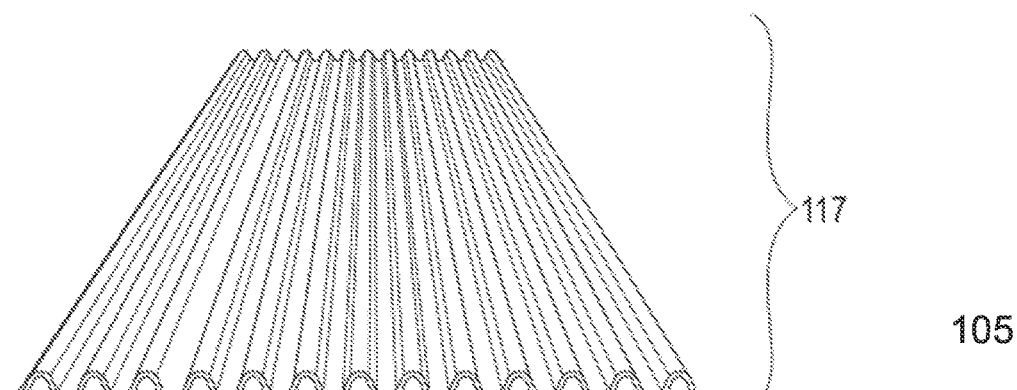
FIG. 2D is an isometric view of one of the inter-locking tray inserts.

The tray insert [117], as shown in FIG. 2D, can be constructed from high-density polyethylene or food-grade ABS plastic, or other plastic materials that are structurally sound. The edges are rounded and the insert serves as the workstation platform that plant pots/trays/cubes occupy. The tray inserts [117], and trays [105, 106, 107] are sloped downward to carry water run-off to the sloped gutter [109]. The angling, or tilting, of the tray inserts [117] is achieved by the positioning of the rear beam [125] in a higher offset position on the uprights [110] relative to the position of the front beam [108] based on the offset of the boltless slotted connection system [111]. The tray insert [117] is the same height as the dividing walls of the interlocking trays [105, 106,107], so when set in place the entire insert tray [117] surface is level, allowing placement of objects on any portion of the surface.

The interlocking trays [105,106,107] may be constructed of fordable metal (or thermoplastic) and designed to interconnect in the following configuration, L [105]→ $C_n$ [106]→R [107]

depending on the desired total width ($d_T$) of the slidable shelving and support system [100], where $C_n$ is optional and n=0, 1, 2 and wherein the width (d) of each tray is normally at least 24 inches or 2 feet wide, and provided as $d_L$ (width of left tray [105]), $d_{cn}$, and $d_R$, respectively, where the total width ($d_T$) of the trays [105, 106, 107] within the assembled shelving unit is determined by utilizing Equation (1):

$$d_T = d_L + d_{CN} + d_R \qquad (1)$$

FIGS. 1A-D represent L→$C_{n=2}$→R, where the center tray [106] is present as two sections.

Each interlocking tray [105,106,107] in this instance, exhibits a three-quarter-inch (¾") drop along the bottom back panel of the tray that locks the tray onto the rear beam [125] and a ¾ inch drop along the bottom front panel locks the tray onto the sloped gutter [109] which locks on to or is part of, the front beam [108]. The front of each interlocking tray [105,106,107] does not include a lip, thereby allowing water to run off into a sloped gutter [109]. Hanging orifices [210] in the rear wall [209] of the interlocking trays [105, 106,107] are included for hanging the trays for cleaning/pressure washing. The left tray [105] of FIG. 2A has a dividing wall [212] positioned on the right and positioned on the left an outer wall [211]. The center tray [106] of FIG. 2B has a left and right dividing wall [212], while the right tray [107] of FIG. 2C has a left dividing wall [212] and a right outer wall [211].

In a further embodiment, the interlocking trays [105, 106, 107] can be used without an interlocking feature, allowing for less assembly and materials for production. The interlocking feature can also be provided as a rubber u-channel for watertight seal placed over the adjacent dividing walls of the interlocking trays [105,106,107].

Figure 2E:
FIG. 2E is a detailed illustration of the rear portion of the interlocking trays.
Figure 2F:
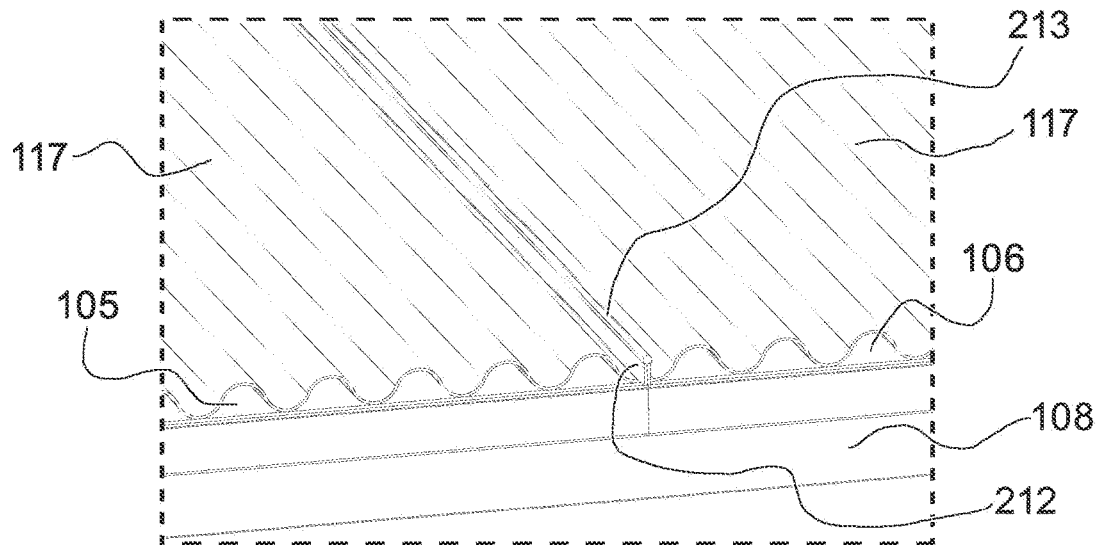
FIG. 2F is a detailed illustration of the front portion of the interlocking trays.

FIGS. 2E and 2F are detailed illustrations of the rear and front respectively, of the interlocking trays [105, 106] showing the interlocking functionality [213] which can be molded as part of the tray or a separate piece. This functions to seal the dividing walls [212] and prevents liquid from passing between the interlocking trays [105, 106, 107]. The same function is found when connecting a left tray [105] and right tray [107] when $C_n$ is optional and n=0.

Figure 3:
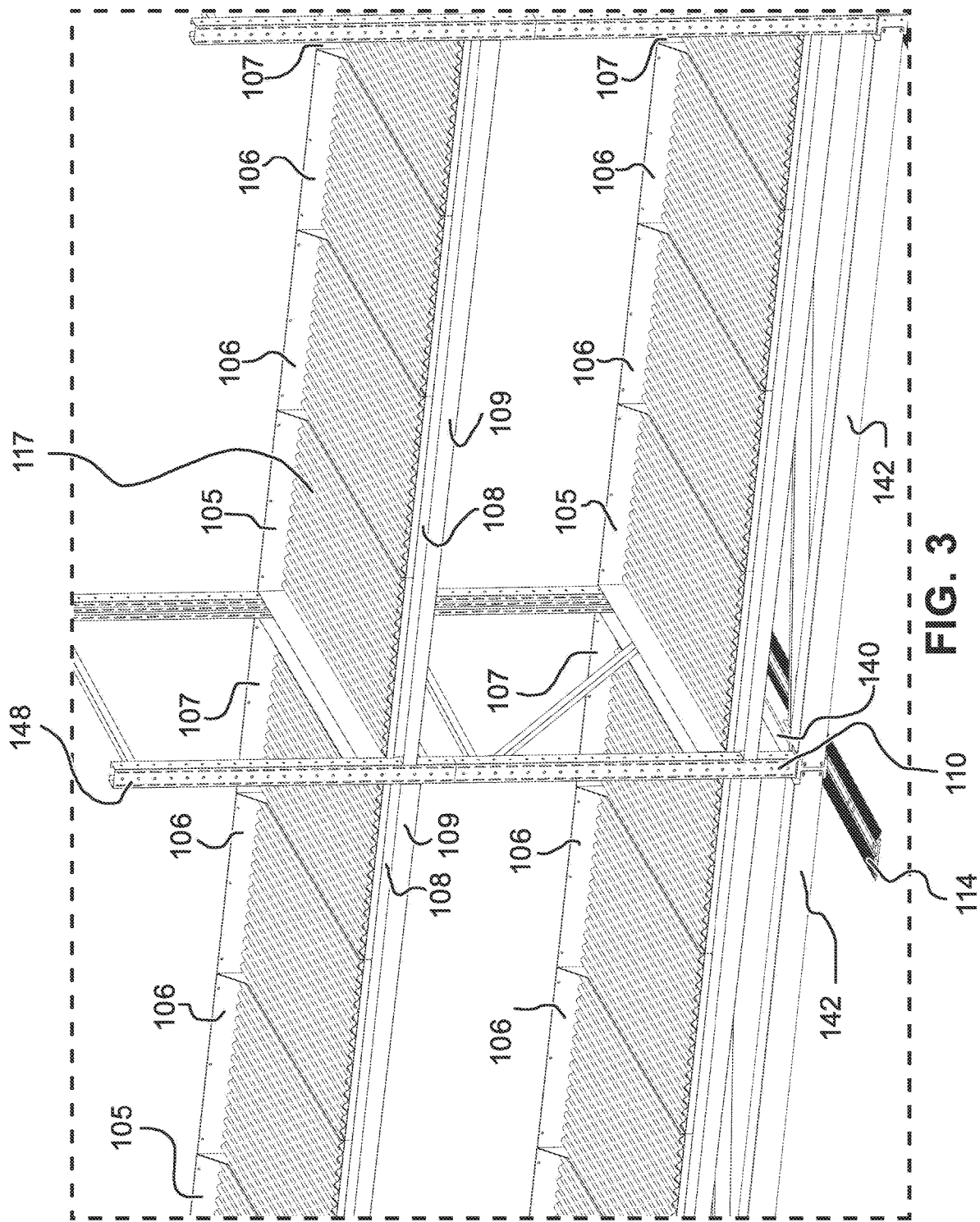
FIG. 3 is a detailed illustration of a two-tiered customizable, slidable shelving and support system connected in series.
Figure 3A:
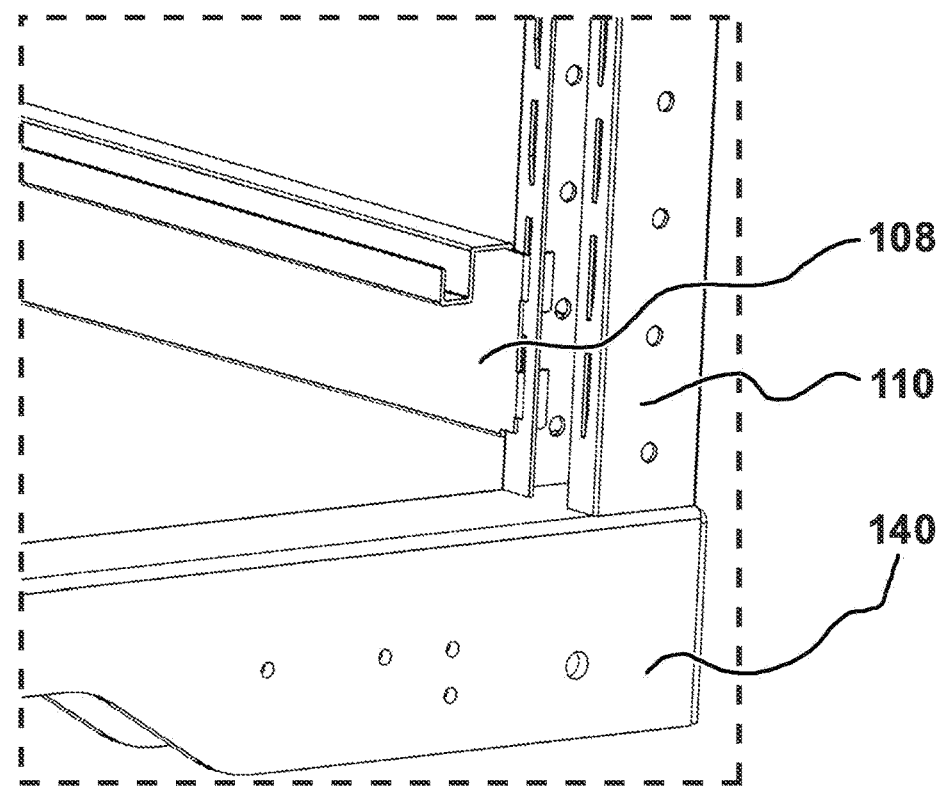
FIG. 3A is a detailed illustration of a secured front gutter beam to the support upright.
Figure 3B:
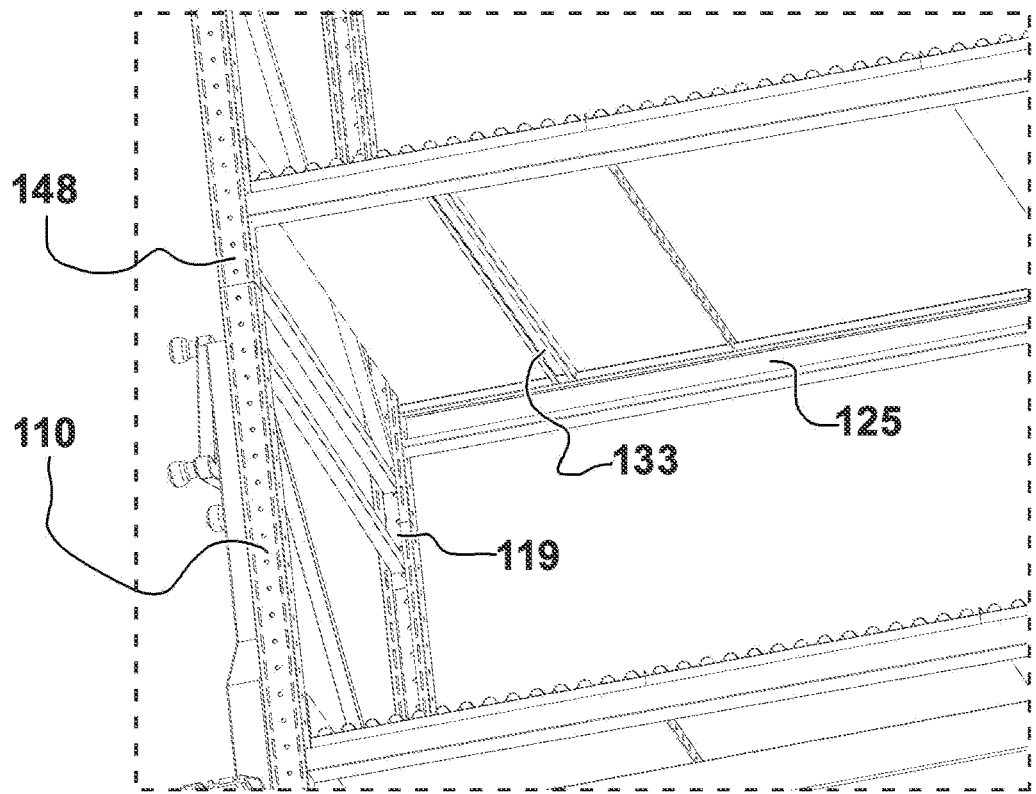
FIG. 3B is a detailed illustration of an extension upright attached to a base channel support panel using a securing sleeve.

FIG. 3 is a detailed illustration depicting a two-tiered customizable, slidable shelving and support system [100a] connected in series to another bay by sharing single support upright consisting of a base channel [140] and upright support panel [110] connected to an extension upright [148] via a securing sleeve [119] (as shown on FIG. 3B). Driveshaft covers [142] are secured by bolts to both the front face, and the top face of the base channel [140].

FIG. 3A is a detailed illustration of the front gutter beam [108,109] connecting to the upright [110] using the interior slots of the slotted system [111]. Diagonal support [128] has been removed for an unobstructed view.

FIG. 3B is a detailed illustration of an extension upright [148] attached to a base channel support panel [110] by bolts using the securing sleeve [119]. This connection is repeated as needed to achieve the desired total height using various lengths of extension uprights [110].

Figure 3C:
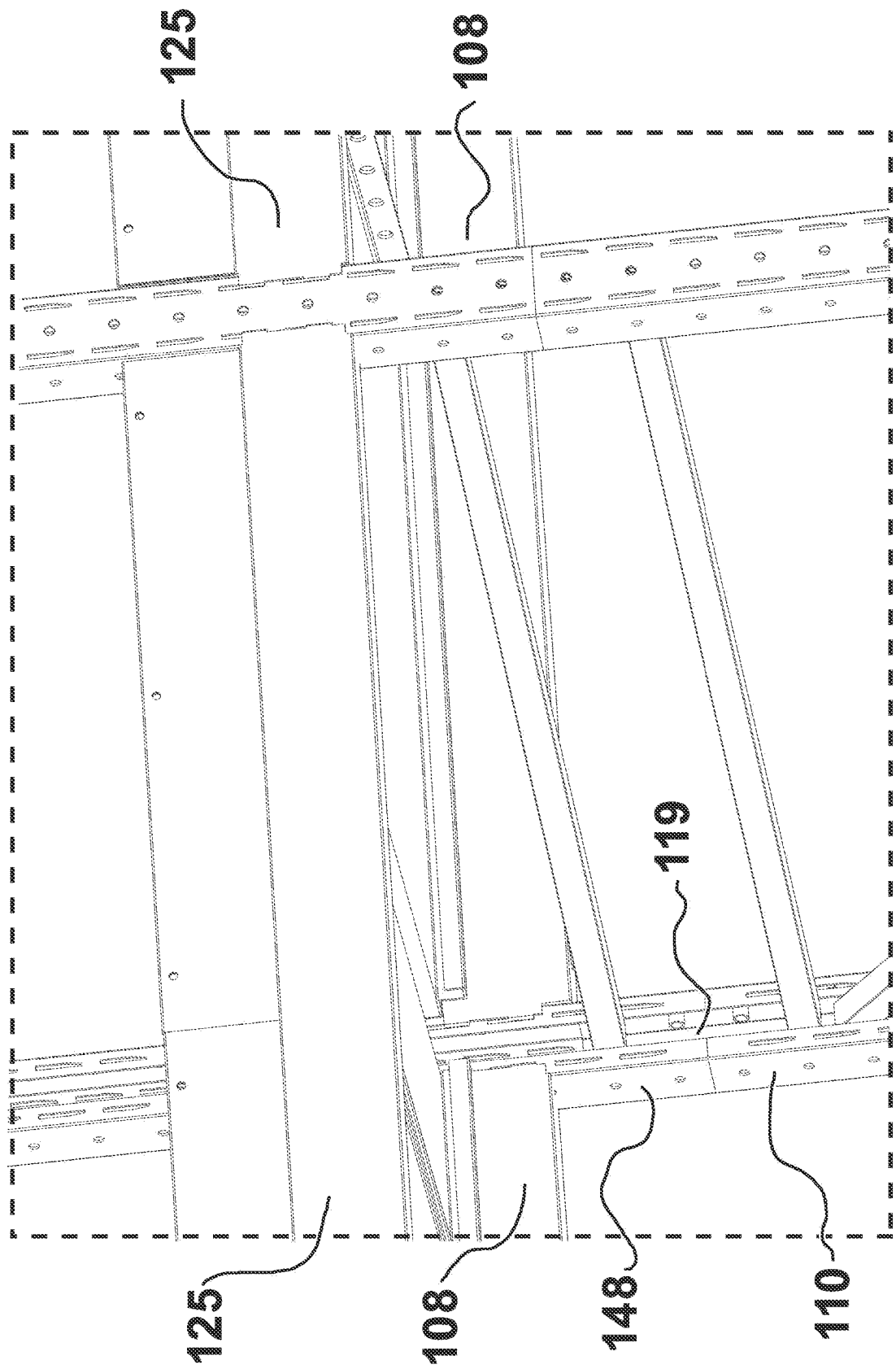
FIG. 3C provides a detailed rear view of a two-tiered customizable, slidable shelving and support system.

FIG. 3C is a detailed rear view of a two-tiered customizable, slidable shelving and support system [100a]. Two rear beams [125] are connected via the exterior offset slotted system [111]. Two front gutter beams [108] are connected via the interior offset slotted system [111], here the slope of the gutter can be seen when comparing the depth of the two gutter beams.

An extension upright [148] is connected to a base channel [140] upright support panel [110] by a securing sleeve [119].

Figure 4A:
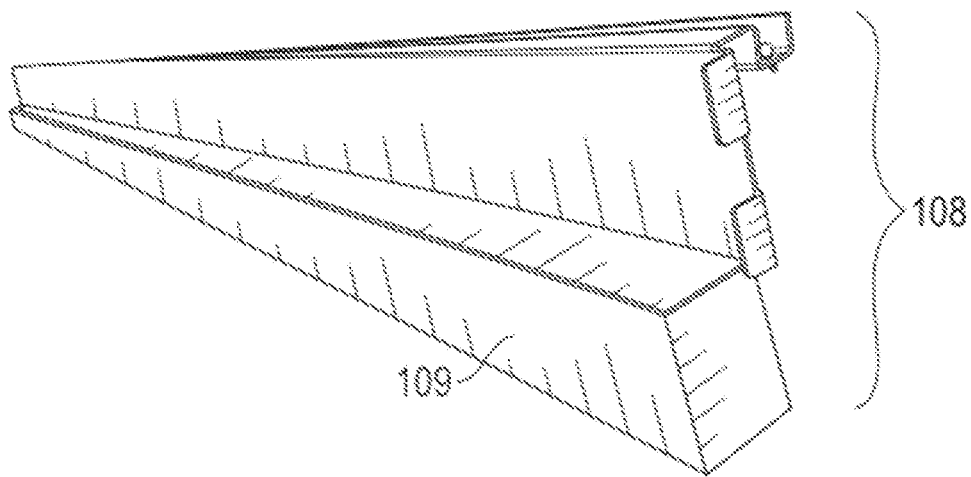
FIG. 4A depicts a front beam with sloped gutter.

FIG. 4A depicts the front gutter beam [108] and sloped gutter [109] which mounts to the interior side of the upright support panels [110] via the boltless connection slot system [111]. The sloped gutter [109] directs the water that falls from the interlocking trays [105, 106, 107] for reuse. Possessing a diminutive slope, the sloped gutter [109] directs water flow, unimpeded, to one side of the shelving system where a drainage hole is located and connects a threaded drain or similar attachment to connect plumbing to further direct flow. One embodiment would include a welded-on threaded nipple to the bottom of the gutter; however, a bulkhead fitting could be used.

Figure 4B:
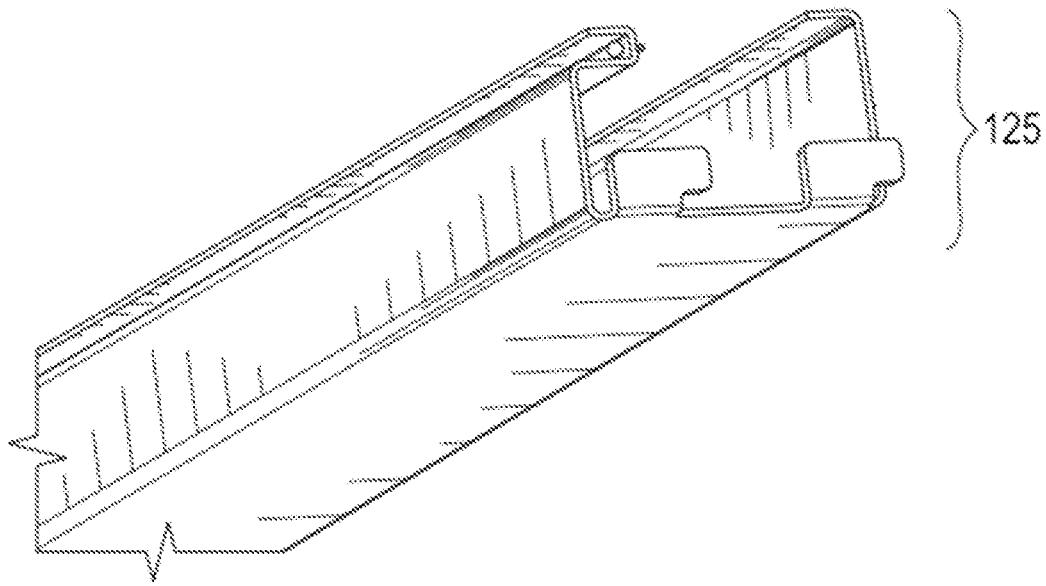
FIG. 4B depicts a rear beam.

FIG. 4B illustrates the rear beam [125] which mounts onto the exterior side of the upright support panels [110] via the boltless connection slot system [111].

The front gutter beam [108], sloped gutter [109] and the rear beam [125] are, in this case, constructed of steel. All of these features can be powder coated and it is possible that proper thermoplastics can be employed that function as well or better than steel or other construction metals.

Figure 5:
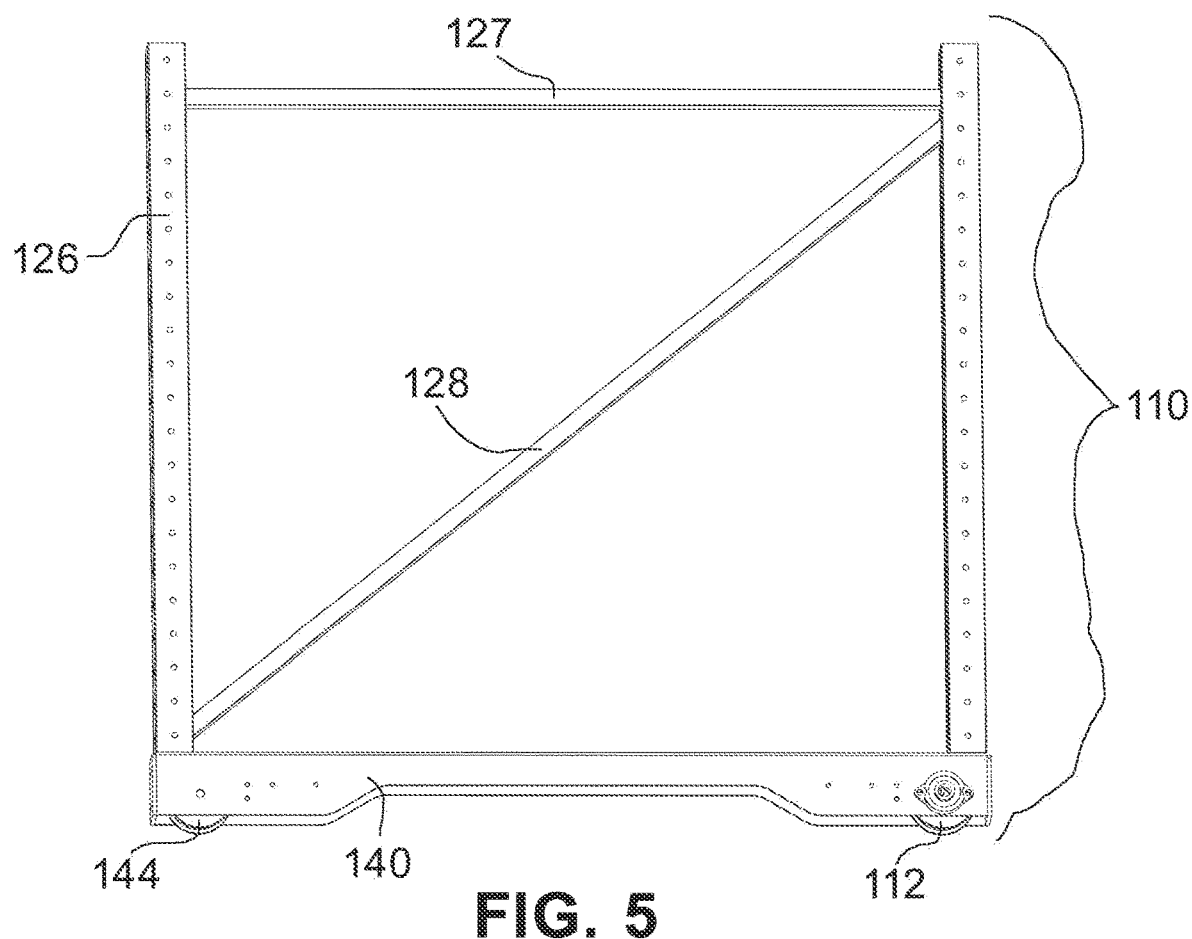
FIG. 5 provides an image of a single upright support panel with crossbar, secured wheel channel, bearing wheel, and a driven wheel with flange bearings.
Figure 5A:
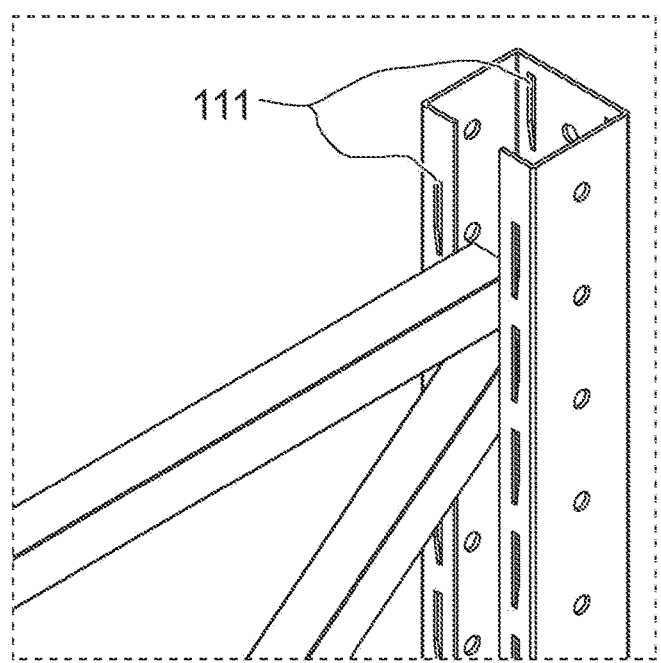
FIG. 5A provides a detailed illustration of the offset slotted mounting holes found on all upright supports.

FIG. 5 illustrates the left and right upright support panels [110]. The upright panels [110] are comprised of parallel hollow leg members [126] with slotted mounting holes [111] every 2 inches on the exterior (outward face) and also a matching offset set of slotted mounting holes every 2 inches on the interior (inward face) [111], one or more parallel panel support cross member [127], which is perpendicular to the hollow leg members [126]. One base channel [140], supports the structure and connects the parallel hollow leg members [126]. It may have one or more vertical diagonal cross member(s) [128] per upright support panel [110]. Upright supports of various sizes, including the upright extension [148] are constructed in the same manner as above with the exception of the base wheel channel, which is replaced with a second parallel panel support cross member [127].

Regarding the base channel [140], which has an axle bolt hole on one side to mount a bearing wheel [144] and an axle hole on the other side to mount a driven wheel [112], the driven wheel [112] is attached via two flange bearings and a keyway is used to prevent free rotation. The axle protrudes outward on either side and can connect to either a sprocket housed internally in the drive box [143], a driveshaft [139], or nothing at all. The base channel [140] is beveled in the center to reduce weight and improve airflow along the floor plane. Other tapped holes are found on the base channel to mount other features such as, optional Anti-Tip brackets [145] and diagonal supports [141]. The use of a horizontal diagonal support [141] between each upright support panel [110] further imparts shear stress resistance support to the structure.

FIG. 5A is a detailed illustration of the offset slotted mounting holes [111].

Figure 5B:
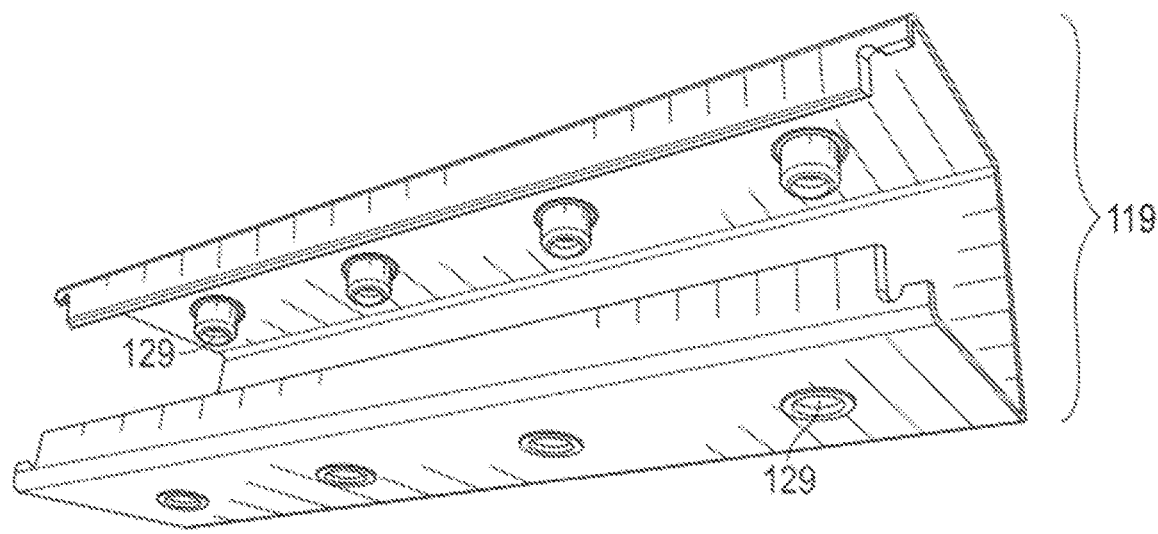
FIGS. 5B and 5C provide images of the securing sleeve for multi-tier configurations or optional accessories.

FIG. 5B shows a securing sleeve [119] that sleeves into the top or upright support panels [110] (not shown) that has threaded rivets [129] to receive small bolts to secure the upright support panel [110] to and upon other upright support panels of various heights to extend the total height as required for the final product height.

The securing sleeve [119] can connect various part options and provides structural rigidity to the overall system [100].

Figure 5C:
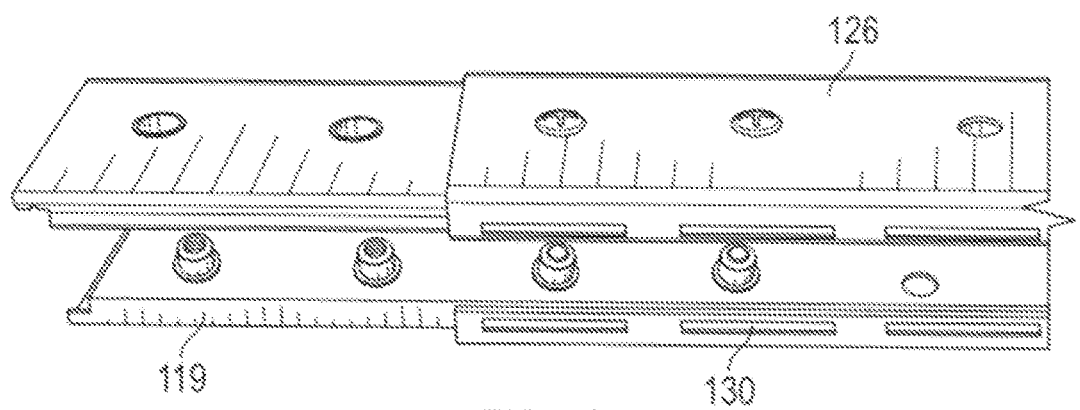

FIG. 5C shows the securing sleeve [119] attached to the hollow leg member [126] upper end of an upright support panel [110] in preparation for inclusion of an additional tier or a customizable feature.

Rather than tear drop style orifices, the slidable shelving and support system [100] will use slit orifices [111], although another shaped orifice can be employed if desired. The slit orifices [111] are designed for ease of assembly, customization, and disassembly of the slidable shelving and support system [100].

Figure 6:
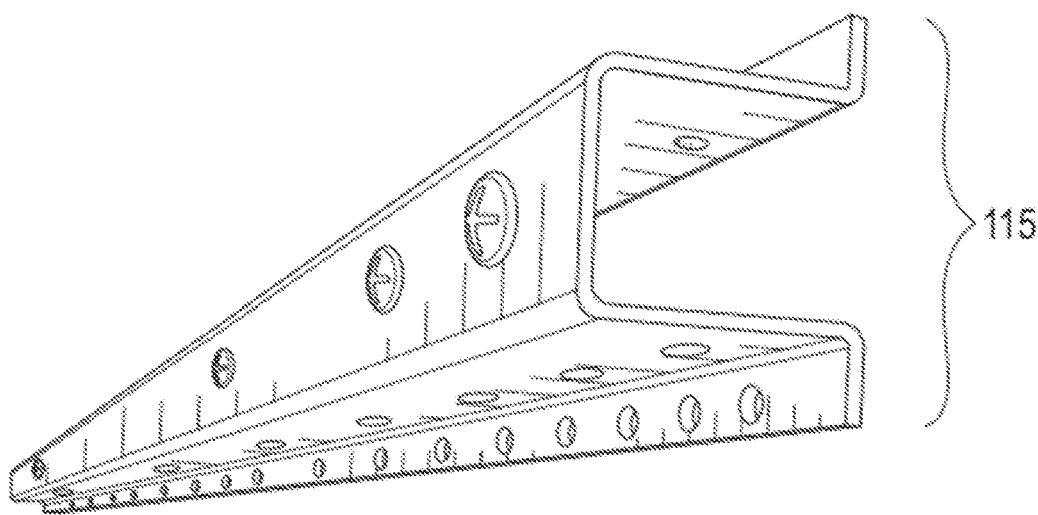
FIG. 6 is an image of the optional trellis pole.
Figure 6A:
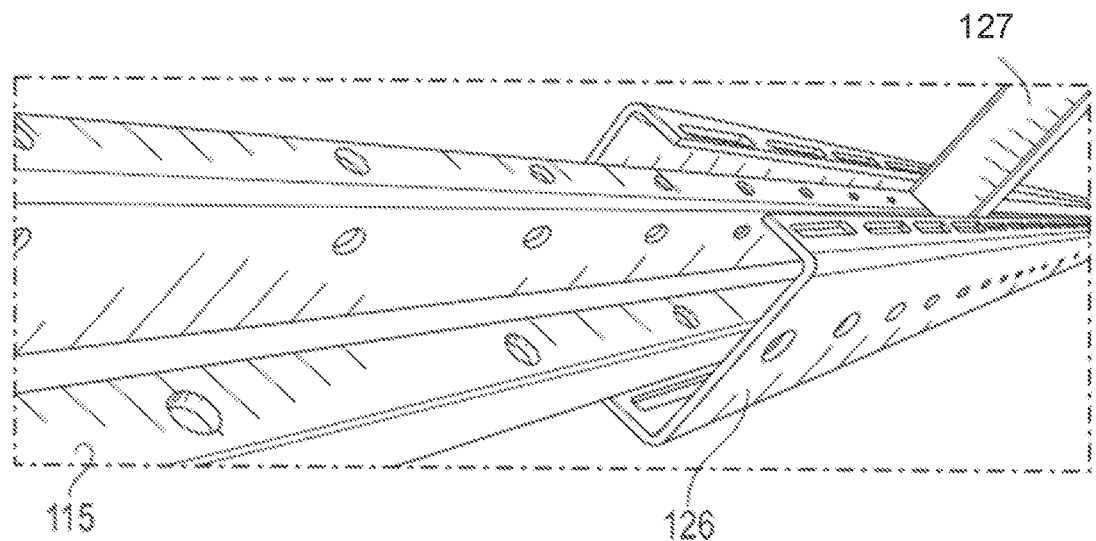
FIGS. 6A and 6B are images of an optional trellis pole attached to the upright support panel.
Figure 6B:
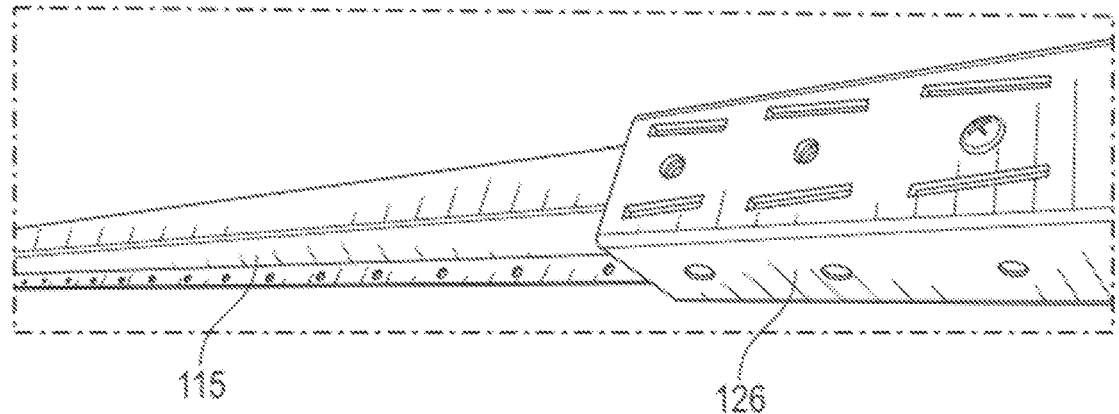

FIG. 6 depicts the telescoping trellis pole [115]. As plants get taller, growers need poles in corners of grow canopies to attach trellis netting to help support taller plants. The trellis pole [115] is bent and shaped so that when it is inserted into the hollow leg member [126] of the upright channel support panels [110] or similar support panels, as shown in FIGS. 6A and 6B, it does not interfere with the parallel panel support cross members [127], which are perpendicular to the hollow leg members [126], and do not interfere with the diagonal cross member [128].

Figure 7A:
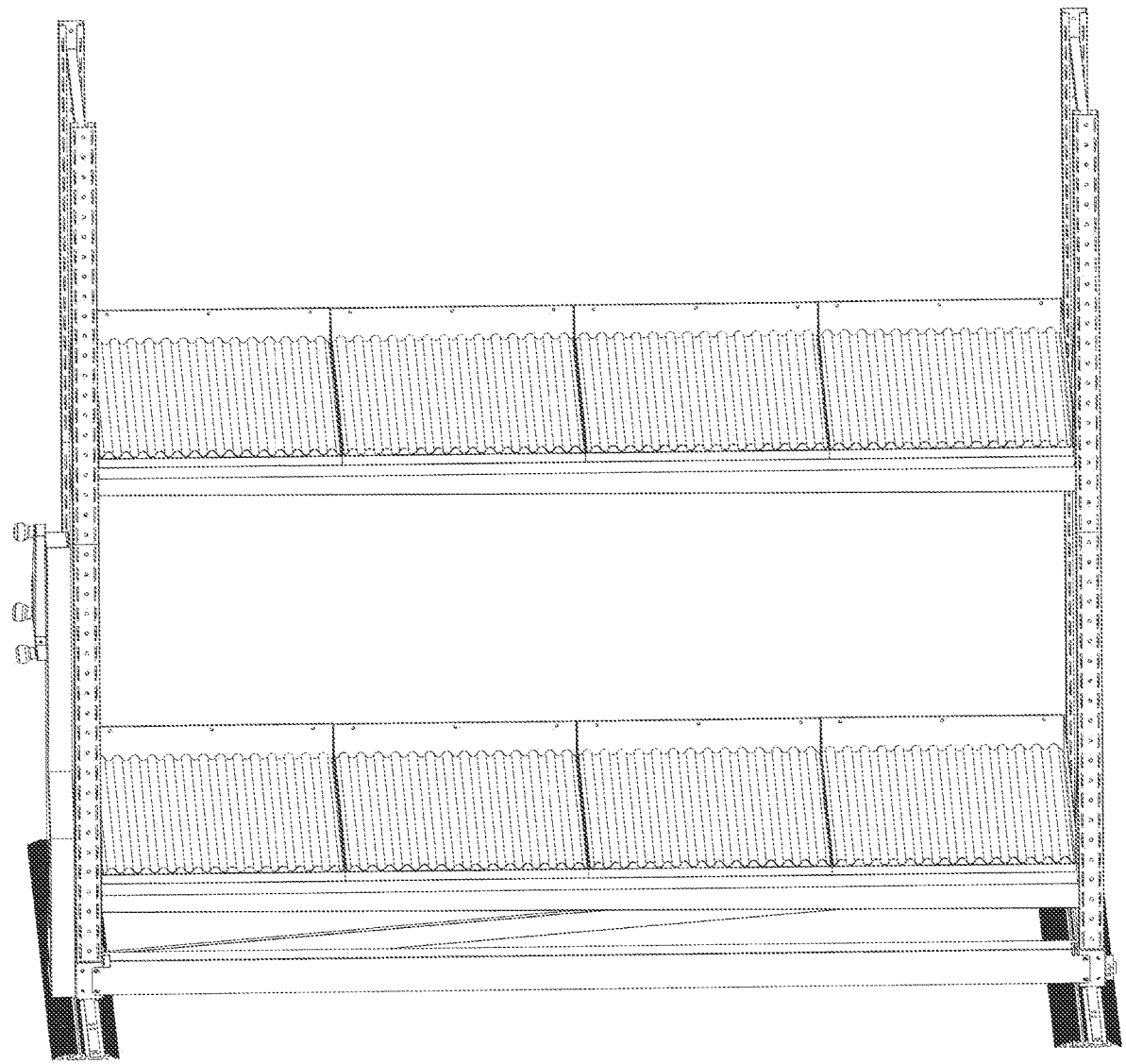
FIGS. 7A, 7B, and 7C are front, side, and rear illustrations of a two-tiered customizable slidable shelving and support system.
Figure 7B:
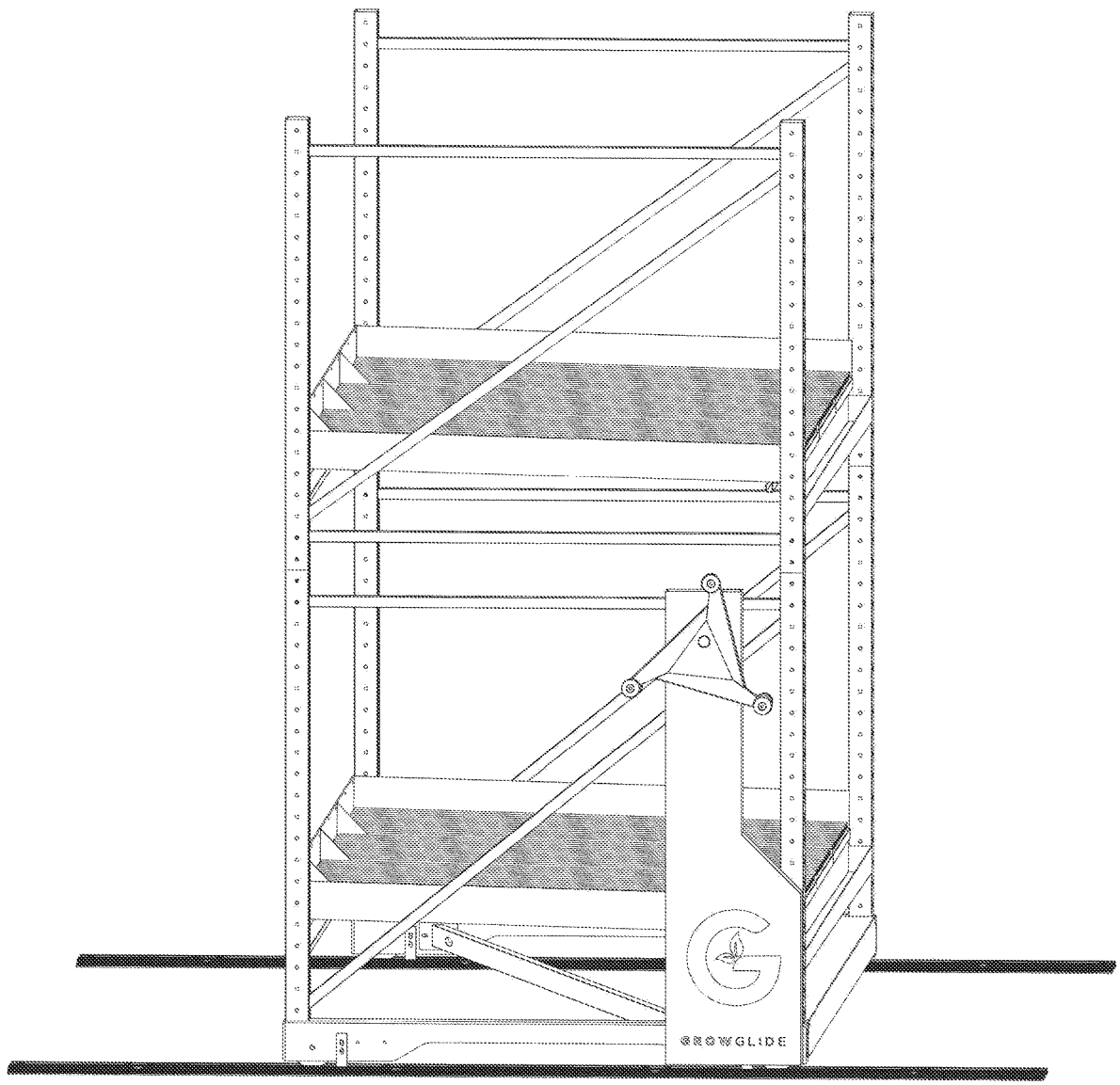
Figure 7C:
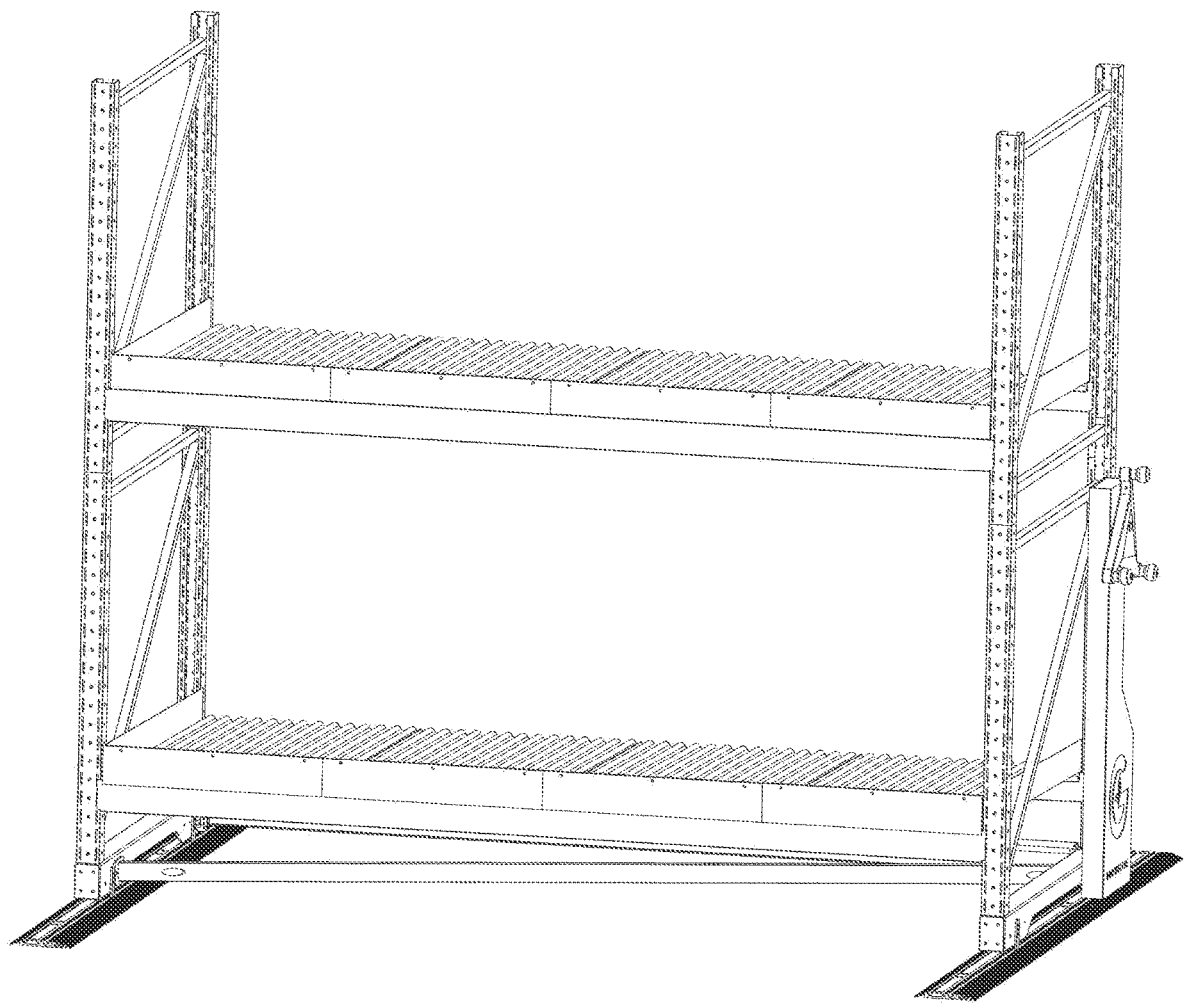

FIGS. 7A, 7B, and 7C provide front, side, and rear views, respectively, of a two-tiered customizable, slidable shelving and support system [100a]. FIGS. 7A-7C represent the use of the construction/constructed equation; $L \rightarrow C_{n=2} \rightarrow R$ for each tier, where the center tray is present as two sections. Shelf spacing can be customized as shelves adjust vertically in 2-inch increments. Additionally, the number of shelves that can be mounted to the slidable shelving and support system [100a] is only limited by the amount of space the consumer has available, both vertical and horizontal.

Figure 8:
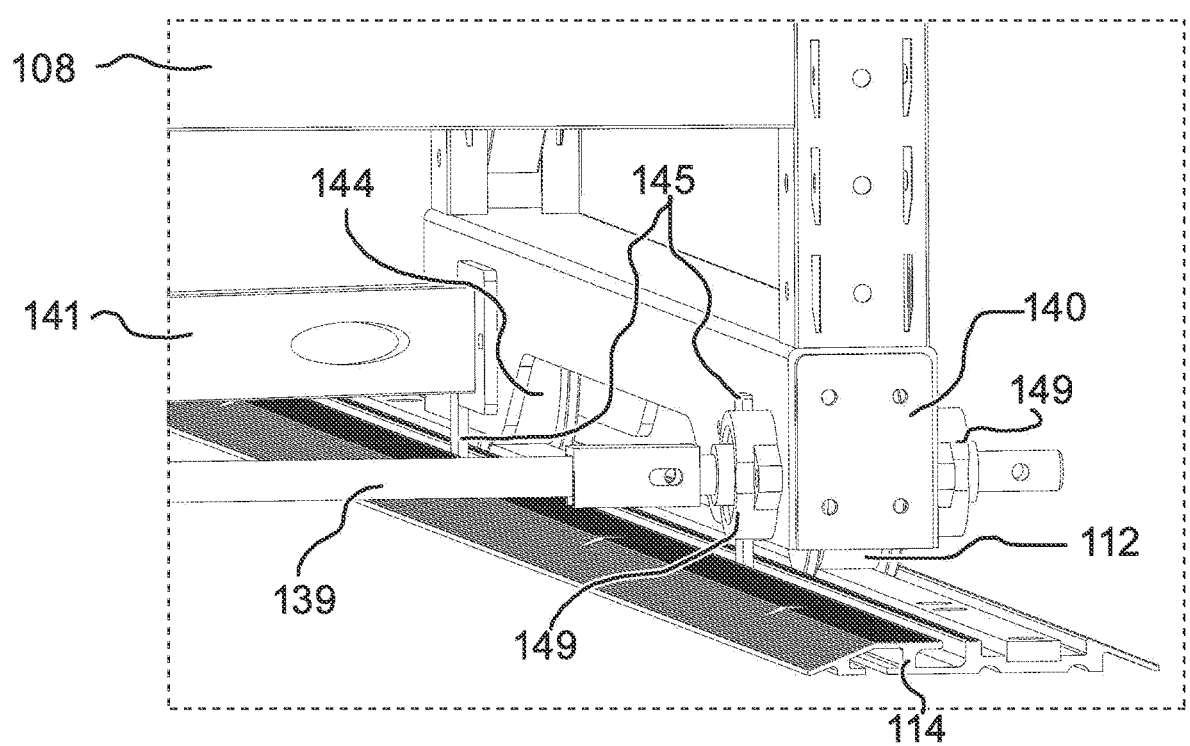
FIG. 8 is a detailed illustration of the driveshaft and driven wheel axis.

FIG. 8 provides a detailed front view of the drive shaft [139] connecting to the drive axle of the drive wheel [112] which is supported by two flange bearings [149] bolted to the base wheel channel which is part of the base channel [140]. The drive shaft cover [142] has been removed for an unobstructed view.

Figure 9:
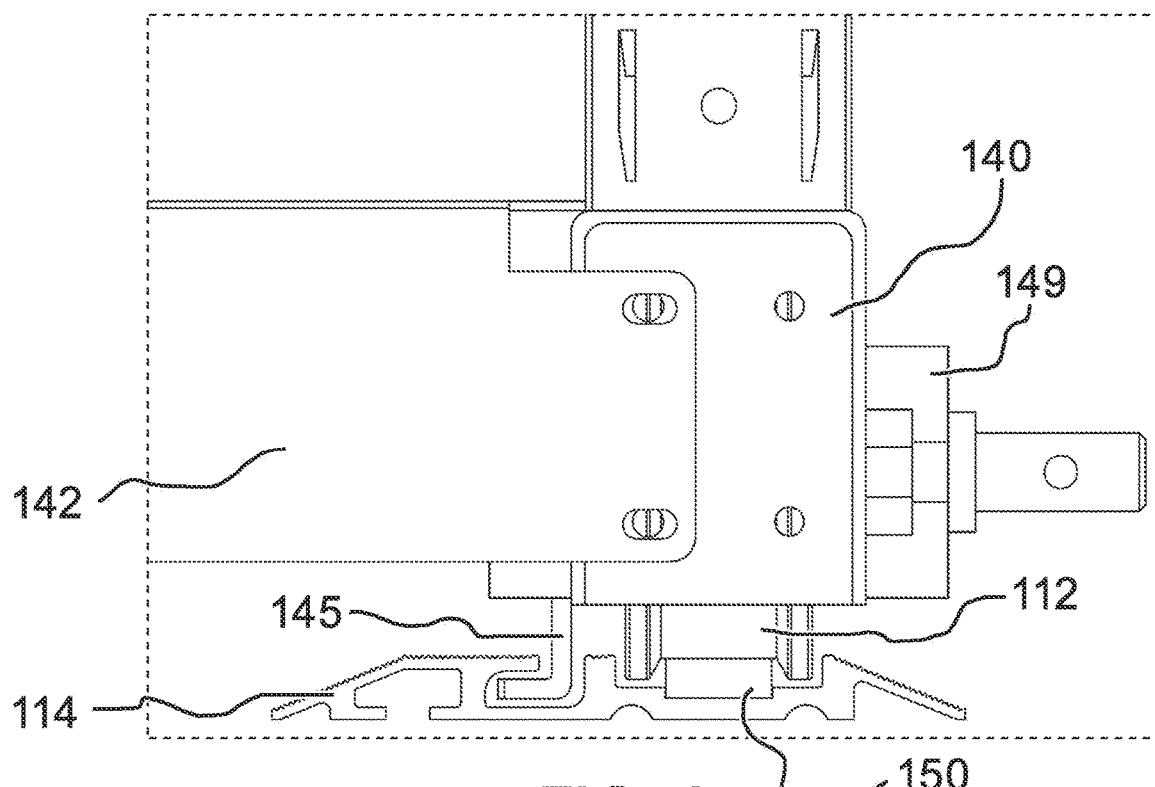
FIG. 9 is a detailed illustration of the floor-mounted track and anti-tip mechanism.

FIG. 9 is a detailed illustration of the two-piece mounted floor track consisting of an extruded aluminum track [114] and a steel bar [150]. The driven wheel [112] rolls on the steel bar [150] and does not contact the aluminum track. [114] The aluminum track contains an anti-tip channel which allows the anti-tip bracket [145] to glide freely within this channel without contacting the track. Bolts pass through the steel bar [150] and the aluminum track [114] to secure both to the floor. This assembly prevents the slidable shelving and support system [100] of various lengths and heights from being able to disconnect from the floor-mounted track in the event of misuse or a seismic event.

The customizable, slidable shelving and support system [100] is offered in a standard eight (8) foot assembly configuration, represented as L→$C_{n=2}$→R, including a left tray, two center trays, and a right tray. Customization of the tray connections to include L→$C_{n=1}$→R or L→$C_{n=0}$→R requires the separate purchase of custom front and rear beams in four (4) and/or six (6) foot lengths in order to accommodate a change in the number of center trays from $C_{n=2}$ to $C_{n=0, 1}$.

The L→$C_{n=2}$→R embodiment is the standard from which any customization would occur.

In one embodiment, the interlocking trays are constructed from 6061 aluminum at a thickness of 1.57 mm, or any metal that can withstand constant exposure to water, support significant amounts of weight, and can withstand the placement of and maintain a welded seam.

In another embodiment, the interlocking trays are powder coated if they are metallic.

In an additional embodiment, the trays and tray inserts may be rectangular, square, round, trapezoidal, triangular or of any desired shape for the space allowed and of sufficient strength and may incorporate a smooth or textured surface.

In an additional embodiment, the customizable shelving and support system [100] can be used in outdoor greenhouses and by agricultural farmers, as the system has been constructed from materials that will not rust in wet conditions, includes no mechanical or electrical parts, and can be secured to prevent movement as needed.

Methods of locking and unlocking the track wheel system such as utilizing a pin, pawl, brake, clamp, or stop that can be activated manually or remotely by hydraulic, pneumatic, electromagnetic, electro-mechanical means will be apparent to one skilled in the art, and can be employed as desired.

While the principles of this invention have been described in connection with specific embodiments, it should be understood clearly that these descriptions are made only by way of example and are not intended to limit the scope of the invention.

What is claimed is:

1. One or more portable slidable shelving and support apparatus with a customizable tier configuration, comprising:
    interlocking trays with tray inserts, each interlocking tray comprising a left side tray portion, a center tray portion, and a right side tray portion, wherein the left side tray portion, center tray portion, and right side tray portion include a top planar portion; and
    a frame comprising a front beam, a sloped gutter, a rear beam, a center support cross member, a left upright support panel, and a right upright support panel,
    wherein the rear beam is connected to the left and right upright support panels and wherein the sloped gutter mounts to a backside of the left and right upright support panels and is attached to the front beam so that the sloped gutter remains visible,
    wherein the rear beam is secured in an elevated position relative to the front beam that allows for increased drainage of the interlocking trays,
    wherein the left and right upright support panels include one or more grooved wheels attached to each leg of the left and right upright support panels via an aperture that extends through a wheel axle and a fixture that utilizes the aperture such that the fixture is placed upon a mounted floor track surface,
    wherein the apparatus provides at least one workstation or storage area and thereby provides an optimal growth platform for botanical plants from which botanical extracts are extracted by placement of the apparatus in specific locations within certain geographic regions that include glass enclosed rooms or houses, and
    wherein the interlocking trays comprise an interlocking functionality.

2. The apparatus of claim 1, wherein the interlocking functionality comprises a rubber u-channel.

3. The apparatus of claim 1, wherein the interlocking functionality is molded as part of the interlocking tray.

4. The apparatus of claim 1, wherein the front beam, sloped gutter, and rear beam are constructed of steel or thermoplastics.

5. The apparatus of claim 1, wherein the front beam, sloped gutter, and rear beam are powder coated.

6. The apparatus of claim 1, wherein the interlocking trays are constructed from a metal that can withstand constant exposure to water, support significant amounts of weight, and can withstand the placement of and maintain a welded seam.

7. The apparatus of claim 6, wherein the interlocking trays are constructed from 6061 aluminum.

8. The apparatus of claim 1, wherein the interlocking trays are rectangular, square, round, trapezoidal, or triangular.

9. The apparatus of claim 1, wherein the apparatus further comprises a means for locking and unlocking the one or more grooved wheels.

10. The apparatus of claim 9, wherein the means for locking and unlocking comprises a pin, pawl, brake, clamp, or stop.

11. The apparatus of claim 9, wherein the means for locking and unlocking is activated manually.

12. The apparatus of claim 9, wherein the means for locking and unlocking is activated remotely by a means for remote activation.

13. The apparatus of claim 12, wherein the means for remote activation comprises hydraulic, pneumatic, electromagnetic, or electromechanical means.

14. The apparatus of claim 1, wherein the apparatus further comprises a means of moving the apparatus.

15. The apparatus of claim 14, wherein the means of moving the apparatus comprises pushing the apparatus in a forward direction or a reverse direction.

16. The apparatus of claim 14, wherein the means of moving the apparatus comprises a hand crank with interlocking gears.

17. The apparatus of claim 16,
    wherein the means of moving the apparatus further comprises a chain, an upper gear, and a lower gear, and
    wherein the chain connects the lower gear to the upper gear and the upper gear is attached to the hand crank.

18. The apparatus of claim 14, wherein the means of moving the apparatus comprises an electric powered motor.

19. The apparatus of claim 18,
    wherein the means of moving the apparatus further comprises a gear, and
    wherein the electric powered motor turns the gear and the gear interlocks with a track attached to the ground, or provides a means of force to propel the apparatus in a forward direction or a reverse direction along the track.

* * * * *

UNITED STATES PATENT AND TRADEMARK OFFICE
CERTIFICATE OF CORRECTION

PATENT NO. : 11,607,041 B2
APPLICATION NO. : 17/657156
DATED : March 21, 2023
INVENTOR(S) : Darin Siples and Travis Schwartz It is certified that error appears in the above-identified patent and that said Letters Patent is hereby corrected as shown below:

In the Specification
Column 6
Line 40, "V" should be --1/4"--

Signed and Sealed this
Fourth Day of July, 2023

*Katherine Kelly Vidal*

Katherine Kelly Vidal
*Director of the United States Patent and Trademark Office*